(12) United States Patent
McKinney et al.

(10) Patent No.: US 12,461,320 B2
(45) Date of Patent: Nov. 4, 2025

(54) OPTICAL CONNECTOR WITH ROTATABLE BOOT AND RELATED METHODS

(71) Applicant: CORNING RESEARCH & DEVELOPMENT CORPORATION, Corning, NY (US)

(72) Inventors: Larry Todd McKinney, Keller, TX (US); Louis Edward Parkman, III, Keller, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 113 days.

(21) Appl. No.: 18/456,556

(22) Filed: Aug. 28, 2023

(65) Prior Publication Data

US 2024/0069290 A1 Feb. 29, 2024

Related U.S. Application Data

(60) Provisional application No. 63/411,655, filed on Sep. 30, 2022, provisional application No. 63/401,732, filed on Aug. 29, 2022.

(51) Int. Cl.
*G02B 6/38* (2006.01)

(52) U.S. Cl.
CPC ......... *G02B 6/3887* (2013.01); *G02B 6/3831* (2013.01)

(58) Field of Classification Search
CPC ....................................................... G02B 6/38
USPC ........................................................... 385/78
See application file for complete search history.

(56) References Cited

U.S. PATENT DOCUMENTS

| | | | |
|---|---|---|---|
| 7,641,398 B2 | 1/2010 | O'Riorden et al. | |
| 7,712,970 B1 | 5/2010 | Lee | |
| 8,152,384 B2 | 4/2012 | De et al. | |
| 8,152,385 B2 | 4/2012 | De et al. | |
| 8,376,629 B2 | 2/2013 | Cline et al. | |
| 8,662,760 B2 | 3/2014 | Cline et al. | |
| 8,678,669 B2 | 3/2014 | Lee | |

(Continued)

FOREIGN PATENT DOCUMENTS

| | | |
|---|---|---|
| CN | 206696473 U | 12/2017 |
| CN | 207965232 U | 10/2018 |

(Continued)

OTHER PUBLICATIONS

International Search Report and Written Opinion of the International Searching Authority; PCT/US2023/031213; mailed on Nov. 30, 2023, 14 pages; European Patent Office.

*Primary Examiner* — Kaveh C Kianni
(74) *Attorney, Agent, or Firm* — Adam R. Weeks

(57) ABSTRACT

An optical connector includes a connector sub-assembly, an inner housing that receives a rear portion of the connector sub-assembly, a boot extending from the inner housing, and an outer housing coupled to the boot. The outer housing and the boot are configured to allow relative rotation about a longitudinal axis of the optical connector but can move together along the longitudinal axis. The boot can be rotated relative to the inner housing between a locked position in which the outer housing is prevented from moving axially and depressing the end portion of a latch arm of the connector sub-assembly, and an unlocked position in which the outer housing can move axially to depress the end portion of the latch arm.

18 Claims, 12 Drawing Sheets

(56) References Cited

U.S. PATENT DOCUMENTS

| | | |
|---|---|---|
| 8,727,638 B2 | 5/2014 | Lee et al. |
| 8,764,308 B2 | 7/2014 | Irwin et al. |
| 9,063,303 B2 | 6/2015 | Irwin et al. |
| 9,207,410 B2 | 12/2015 | Lee et al. |
| 9,407,073 B2 | 8/2016 | Elenbaas |
| 9,448,370 B2 | 9/2016 | Xue et al. |
| 9,465,172 B2 | 10/2016 | Shih |
| 9,551,842 B2 | 1/2017 | Theuerkorn |
| 9,557,495 B2 | 1/2017 | Raven et al. |
| 9,557,496 B2 | 1/2017 | Irwin et al. |
| 9,595,786 B1 | 3/2017 | Takano et al. |
| 9,599,778 B2 | 3/2017 | Wong et al. |
| 9,678,283 B1 | 6/2017 | Chang et al. |
| 9,678,285 B2 | 6/2017 | Hill et al. |
| 9,684,130 B2 | 6/2017 | Veatch et al. |
| 9,829,650 B2 | 11/2017 | Irwin et al. |
| 9,869,825 B2 | 1/2018 | Bailey et al. |
| 9,927,582 B2 | 3/2018 | Chang et al. |
| 9,933,584 B2 | 4/2018 | Lin |
| 9,941,631 B1 | 4/2018 | Taira et al. |
| 9,946,035 B2 | 4/2018 | Gustafson et al. |
| 9,971,102 B2 | 5/2018 | Raven et al. |
| 10,007,068 B2 | 6/2018 | Hill et al. |
| 10,042,129 B2 | 8/2018 | Taira et al. |
| 10,067,301 B2 | 9/2018 | Murray et al. |
| 10,078,186 B1 | 9/2018 | Hsu et al. |
| 10,114,180 B2 | 10/2018 | Suzic |
| 10,120,138 B2 | 11/2018 | Jones |
| 10,139,572 B2 | 11/2018 | Hopper et al. |
| 10,158,194 B2 | 12/2018 | Takano et al. |
| 10,162,129 B2 | 12/2018 | Smith et al. |
| 10,228,521 B2 | 3/2019 | Gniadek et al. |
| 10,261,268 B2 | 4/2019 | Theuerkorn |
| 10,288,819 B2 | 5/2019 | Chang et al. |
| 10,359,582 B2 | 7/2019 | He |
| 10,444,441 B1 | 10/2019 | Ho et al. |
| 10,520,689 B2 | 12/2019 | Gniadek et al. |
| 10,520,690 B2 | 12/2019 | Takano et al. |
| 10,585,247 B2 | 3/2020 | Takano et al. |
| 10,705,300 B2 | 7/2020 | Takano et al. |
| 10,712,512 B2 | 7/2020 | Ho et al. |
| 10,739,533 B2 | 8/2020 | Gniadek et al. |
| 10,768,381 B2 | 9/2020 | Li |
| 10,830,963 B2 | 11/2020 | Elenbaas et al. |
| 10,928,594 B2 | 2/2021 | Iizumi et al. |
| 10,983,286 B2 | 4/2021 | Takano et al. |
| 11,002,923 B2 | 5/2021 | Ho et al. |
| 11,112,565 B2 | 9/2021 | Chang et al. |
| 11,131,814 B2 | 9/2021 | Iizumi et al. |
| 11,152,748 B2 | 10/2021 | Takano et al. |
| 11,555,966 B2 | 1/2023 | Elenbaas et al. |
| 2010/0220961 A1* | 9/2010 | de Jong ............ G02B 6/38875 385/77 |
| 2011/0299814 A1 | 12/2011 | Nakagawa |
| 2012/0106899 A1 | 5/2012 | Choi |
| 2012/0155810 A1 | 6/2012 | Nakagawa |
| 2014/0169727 A1* | 6/2014 | Veatch ................. G02B 6/3879 385/11 |
| 2015/0177463 A1* | 6/2015 | Lee ...................... G02B 6/3874 385/76 |
| 2015/0212282 A1 | 7/2015 | Lin |
| 2016/0047993 A1 | 2/2016 | Hioki et al. |
| 2018/0172942 A1* | 6/2018 | Bauco .................. G02B 6/3855 |
| 2019/0170949 A1* | 6/2019 | Collier ..................... G02B 6/02 |
| 2019/0170957 A1* | 6/2019 | Butler .................. G02B 6/3878 |
| 2019/0243072 A1* | 8/2019 | Takano ................ G02B 6/3825 |
| 2019/0346633 A1 | 11/2019 | Cloud et al. |
| 2019/0391343 A1* | 12/2019 | Aoshima ............. G02B 6/3879 |
| 2020/0003963 A1* | 1/2020 | Iizumi ................. G02B 6/3871 |
| 2020/0049904 A1* | 2/2020 | Chang ................. G02B 6/3893 |
| 2020/0371299 A1 | 11/2020 | Gniadek et al. |
| 2020/0393630 A1 | 12/2020 | Wong et al. |
| 2021/0141162 A1 | 5/2021 | Ma et al. |
| 2021/0149120 A1* | 5/2021 | Wong .................. G02B 6/3893 |
| 2021/0149125 A1 | 5/2021 | Taira et al. |
| 2021/0165169 A1 | 6/2021 | Takano et al. |
| 2021/0191050 A1* | 6/2021 | Holmberg ............ G02B 6/3821 |
| 2021/0255400 A1 | 8/2021 | Inaba et al. |
| 2021/0263238 A1 | 8/2021 | Tseng |
| 2021/0263239 A1 | 8/2021 | Lin |
| 2021/0263242 A1 | 8/2021 | Lin |
| 2021/0263245 A1 | 8/2021 | Liu |
| 2021/0281005 A1 | 9/2021 | Taira et al. |
| 2021/0286134 A1 | 9/2021 | Taira et al. |
| 2021/0302665 A1 | 9/2021 | Gandla et al. |
| 2021/0302666 A1* | 9/2021 | Gandla ................ G02B 6/3897 |
| 2021/0364704 A1 | 11/2021 | Inaba et al. |
| 2023/0204872 A1* | 6/2023 | Takano .................. G02B 6/406 385/78 |
| 2023/0221500 A1 | 7/2023 | Elenbaas et al. |
| 2023/0358973 A1* | 11/2023 | Higley ................ G02B 6/3888 |
| 2024/0036266 A1* | 2/2024 | Takano ................ G02B 6/3885 |

FOREIGN PATENT DOCUMENTS

| | | |
|---|---|---|
| CN | 111399134 A | 7/2020 |
| GB | 2468188 B | 5/2011 |
| KR | 10-1371686 B1 | 3/2014 |
| KR | 10-1535434 B1 | 7/2015 |
| WO | 2013/104125 A1 | 7/2013 |
| WO | 2014/150994 A1 | 9/2014 |
| WO | 2019/191522 A1 | 10/2019 |
| WO | 2020/013059 A1 | 1/2020 |
| WO | 2020/021966 A1 | 1/2020 |

* cited by examiner

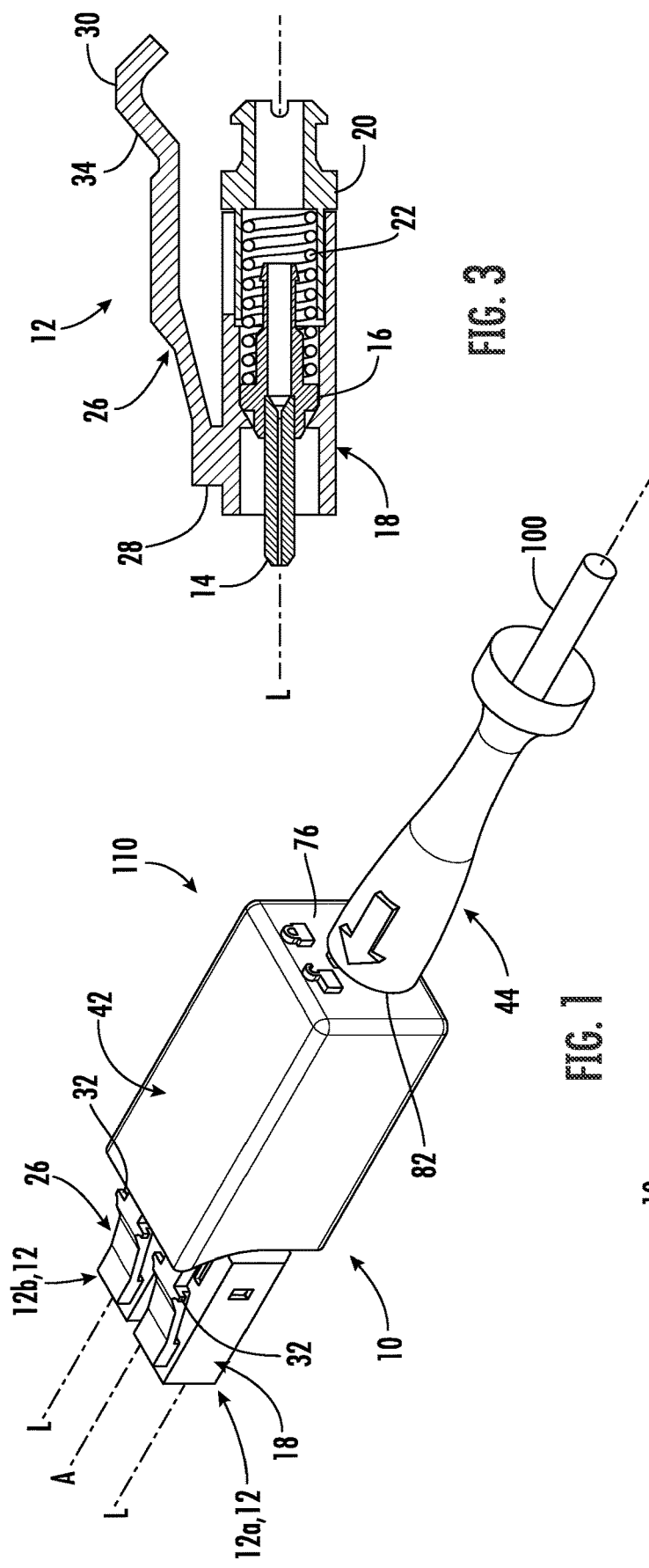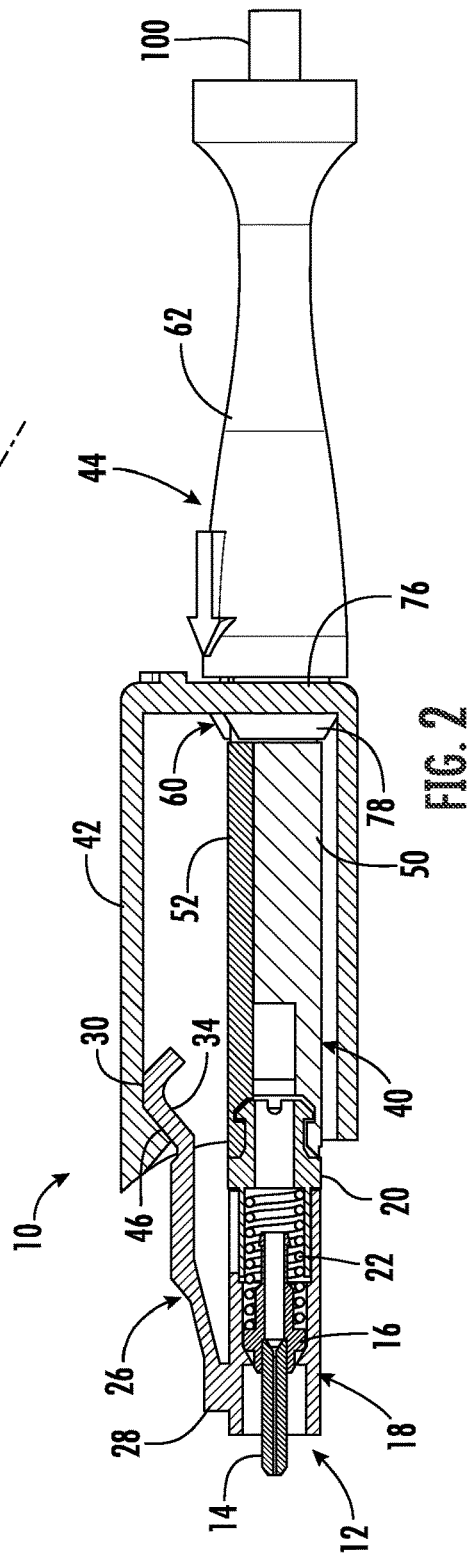

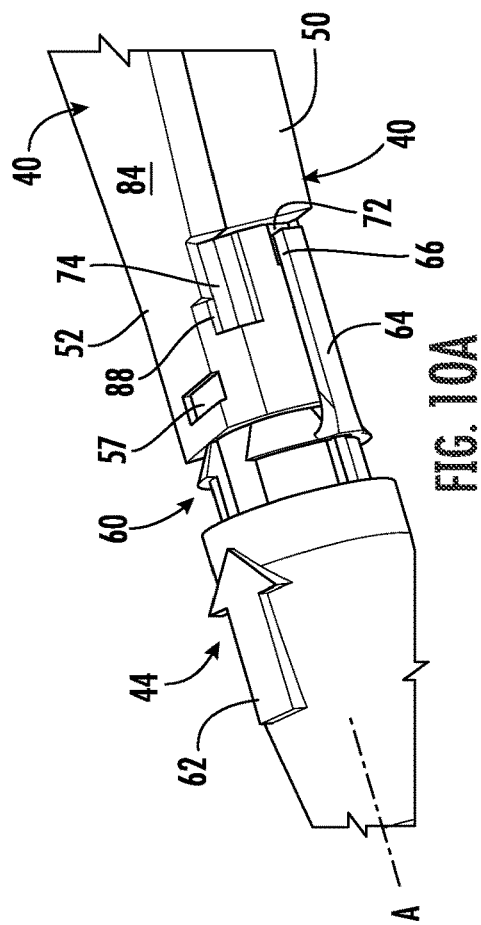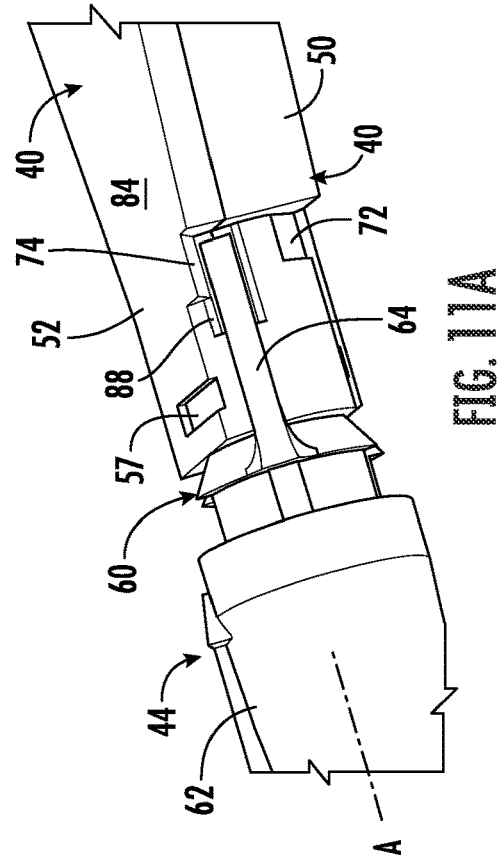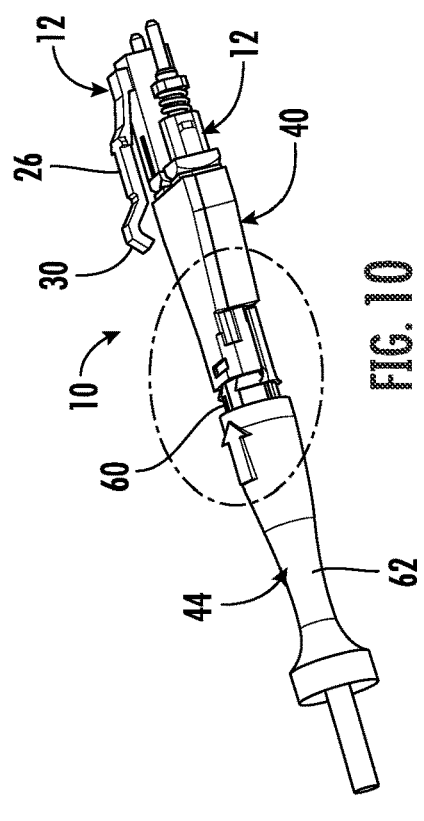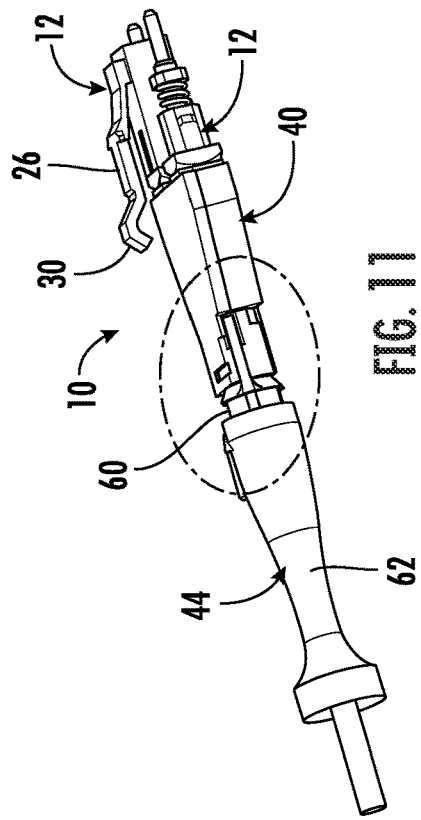

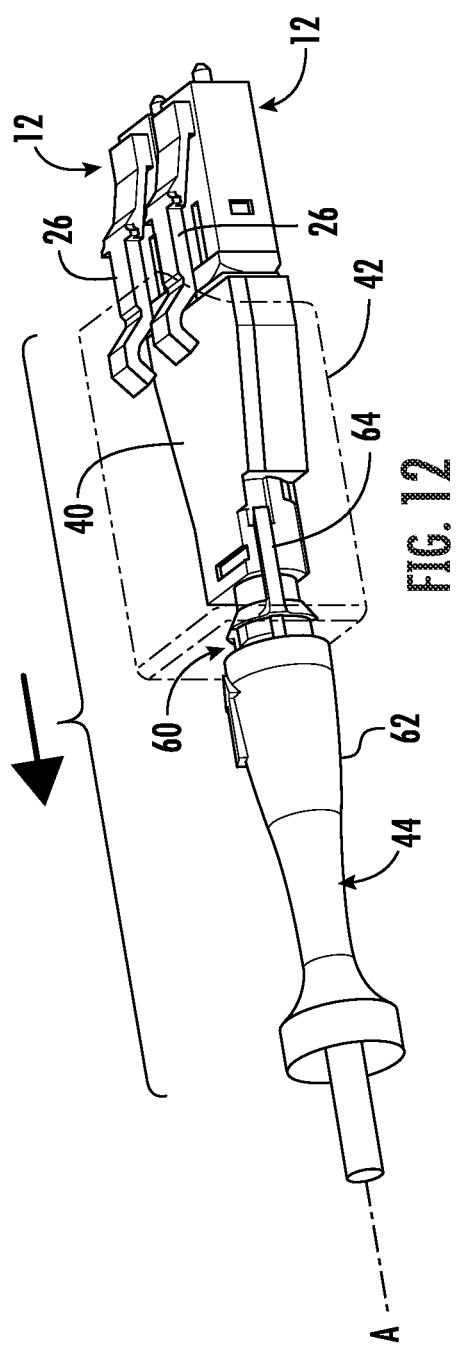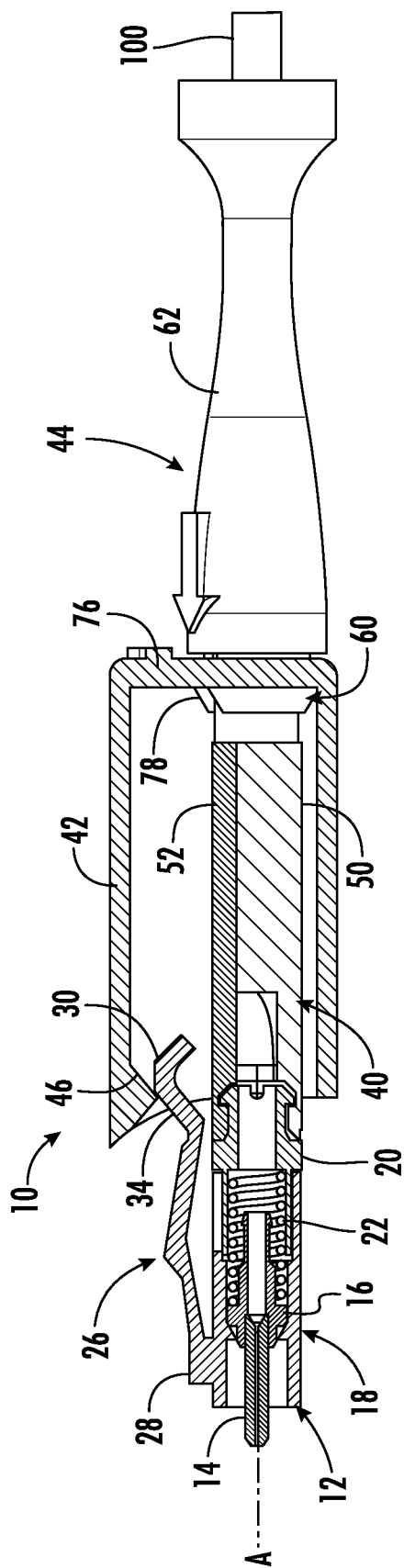

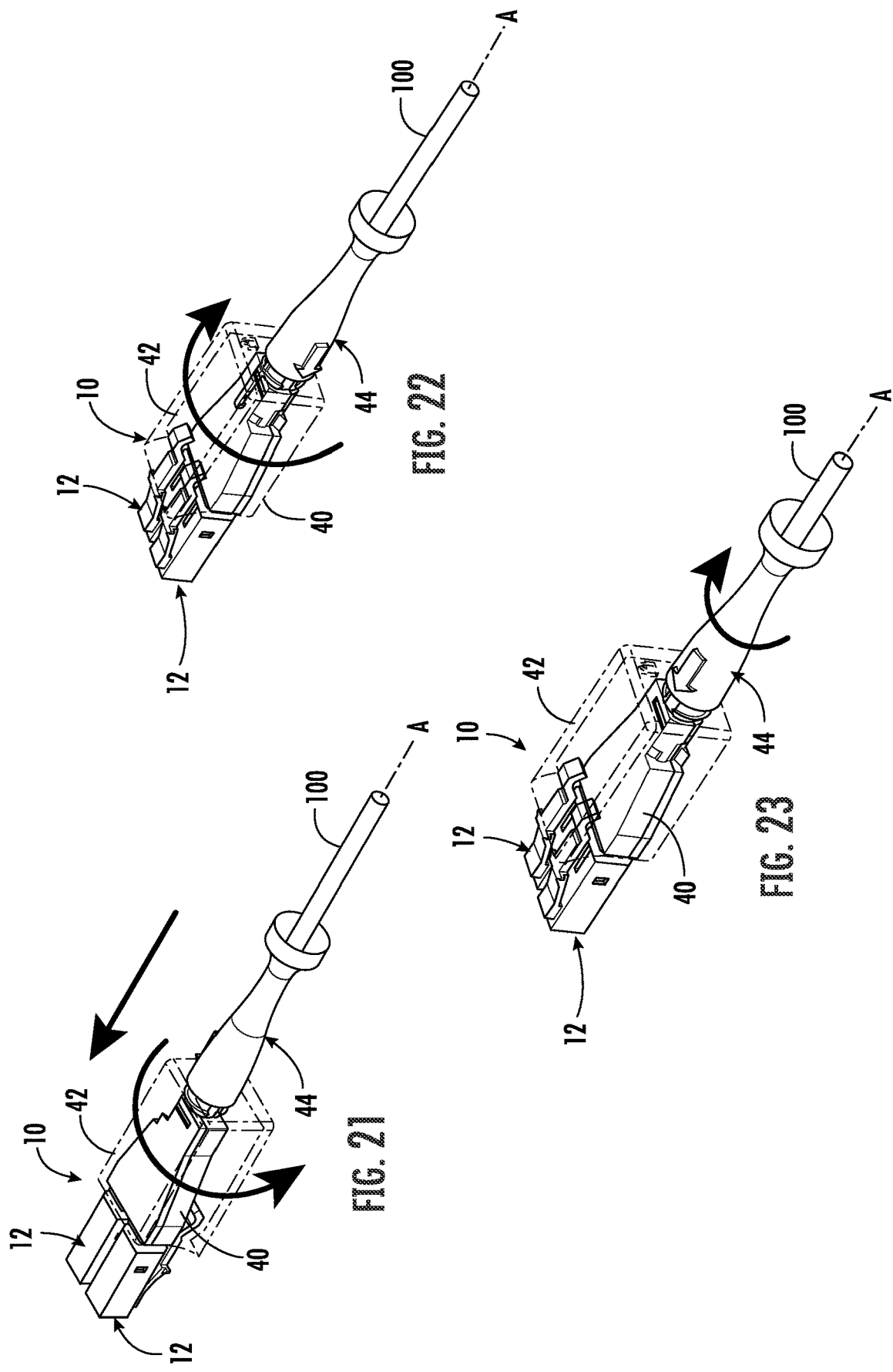

OPTICAL CONNECTOR WITH ROTATABLE BOOT AND RELATED METHODS

PRIORITY APPLICATIONS

This application claims the benefit of priority of U.S. Provisional Application No. 63/411,655, filed on Sep. 30, 2022, and U.S. Provisional Application No. 63/401,732, filed on Aug. 29, 2022, the content of which is relied upon and incorporated herein by reference in entirety.

BACKGROUND

This disclosure relates generally to telecommunication cable assemblies, such as optical cable assemblies. More particularly, this disclosure relates to optical connectors that including latching features for engaging an adapter and an unlocking mechanism to assist with de-latching from the adapter and/or reversing polarity.

In a telecommunications system that uses optical fibers, there are typically many locations where cables that carry the optical fibers connect to equipment or other cables. Optical connectors are often provided on the ends of the cables to conveniently provide these connections. The connectors are designed to engage adapters that align the connectors with other connectors or other components so that data can be transmitted between the mated components.

Some connectors include one or more latch arms that extend outwardly from a connector body. Each latch arm is designed to engage the adapter in a manner that retains the connector in the adapter. To remove the connector from the adapter, each latch arm is first flexed toward the connector body to release the engagement with the adapter. Some connectors are designed with components to assist such flexing/actuation of the latch arm(s) and, in some cases, also assist with removing the connector from an adapter.

For example, LC connectors are widely used in data centers and other environments where a high density of optical connections are desired. These types of connectors are often used in a duplex configuration due to the bi-directional nature of data center networks. Many LC duplex connector designs integrate two LC connector sub-assemblies with a common boot ("uniboot") to terminate a two-fiber cable or a two-fiber fanout leg of a larger cable. Some of the designs include a housing, pull tab, or some other component configured to assist with actuating the latch arms of the connector sub-assemblies. The designs, however, can be relatively complex, perform poorly, have limited functionality, and/or require a large number of specially-designed components.

Similar challenges exist with respect to other features for duplex connectors. For example, many LC duplex uniboot connectors are configured to allow polarity of the connector to be reversed. Polarity exists because one of the LC connector sub-assemblies transmits data in one direction (an "A" direction) and the other LC connector sub-assembly transmits data in an opposite direction (a "B" direction), such that the duplex connector may have an A-B configuration or B-A configuration with respect to a defined orientation of the connector. Changing from one configuration to other in the field can be desirable, and many designs now exist with this feature. However, the designs can require complex components or processes to reverse polarity.

As can be appreciated, designing duplex connectors (and especially LC duplex uniboot connectors) with multiple features can be challenging, and there remains room for improvement over known designs.

SUMMARY

An optical connector includes a connector sub-assembly, an inner housing having a front side that receives a rear portion of the connector sub-assembly, a boot extending from a rear side of the inner housing, and an outer housing coupled to the boot. The outer housing and the boot are configured to rotate relative to each other about a longitudinal axis of the optical connector but move together along the longitudinal axis. The boot can be rotated relative to the inner housing about the longitudinal axis between a first rotational position and a second rotational position. In the first rotational position, which may be considered a "locked" position, relative movement between the boot and the inner housing along the longitudinal axis is limited so that the outer housing is not configured to move axially rearward with the boot to depress an end portion of a latch arm of the connector sub-assembly. In the second rotational position, which may be considered an "unlocked" position, relative movement between the boot and the inner housing along the longitudinal axis is permitted so that the outer housing is configured to move axially rearward with the boot to depress the end portion of the latch arm.

According to one embodiment, the connector sub-assembly includes a ferrule configured to support at least one optical fiber, a connector body surrounding at least a portion of the ferrule, and the latch arm, which extends outwardly and rearwardly from a front portion of the connector body. As an example, the connector sub-assembly may be an LC connector. The outer housing extends over at least the end portion of the latch arm. As mentioned above, the outer housing can be moved rearward when the boot is in the second rotational position to depress the end portion of the latch arm so that the end portion moves more toward the connector body.

Aspects of this disclosure may apply to connectors with a single connector sub-assembly or multiple connector sub-assemblies. To this end, the connector sub-assembly referred to above may be a first connector sub-assembly in some embodiments, and the optical connector may further include a second connector sub-assembly having a rear portion received in the front side of the inner housing. The second connector sub-assembly may have a construction similar to the first connector sub-assembly. For example, the second connector sub-assembly may also include a latch arm having a distal end portion configured to be depressed by the outer housing when the outer housing moves rearward.

In some embodiments, the rear portion of the connector sub-assembly may be received in the front side of inner housing in a manner that allows the connector sub-assembly to be rotated relative to the inner housing about a connector sub-assembly axis. In other words, the connector sub-assembly need not be removed from the inner housing for rotation. Such relative rotation may be limited by the outer housing in various ways, or not at all. For example, in some embodiments, when the boot is in the first rotational position, the outer housing is configured to restrict the connector sub-assembly from rotating about the connector sub-assembly axis, or at least restrict rotation any meaningful amount. Thus, although some rotational "play" may be allowed between the connector sub-assembly and the outer housing in some embodiments, the connector sub-assembly is prevented from rotating to a substantially different orientation, such as being prevented from rotating more than 90 degrees or even less than that, such as no more than 45 degrees, 15 degrees, 10 degrees, etc. (different embodiments can provide different amounts of restriction).

In some embodiments, in the second rotational position of the boot, relative movement between the boot and the inner housing along the longitudinal axis is permitted so that the outer housing is configured to move axially with the boot a sufficient distance to allow the connector sub-assembly to rotate to a substantially different orientation, such as an orientation where the connector sub-assembly is rotated more than 90 degrees about the connector sub-assembly axis. The connector sub-assembly may be configured to rotate to the opposite side of the connector, i.e. 180 degrees about the connector sub-assembly axis, for the purpose of reversing the polarity of the connector.

In other embodiments, the outer housing may still be configured to restrict substantial rotation of the connector sub-assembly even when the boot is in the second rotational position. For example, even when the outer housing is moved rearward when the boot is in the second rotational position, there may be a limit to such movement so that the outer housing still prevents the connector sub-assembly from rotating more than a meaningful amount about the connector sub-assembly axis. The amount is no more than 90 degrees, and may be as small as no more than 10 degrees in some embodiments. To allow rotation more than a meaningful amount, the boot may be rotatable relative to the inner housing about the longitudinal axis between the second rotational position and a third rotational position. In the third rotational position, relative movement between the boot and the inner housing along the longitudinal axis is permitted so that the outer housing is configured to move axially with the boot a sufficient distance to allow the connector sub-assembly to rotate a large amount, such as more than 90 degrees about the connector sub-assembly axis. The connector sub-assembly may be configured to rotate to the opposite side of the connector, i.e. 180 degrees about the connector sub-assembly axis, for the purpose of reversing the polarity of the connector.

According to another aspect of this disclosure, in some embodiments the boot includes a locking arm having a catch. The locking arm may be part of a substrate component, and the boot may also include a strain relief component that is coupled to the substrate component so that the boot has a two-piece construction. In other embodiments the boot may have a one-piece construction, however. In the first rotational position of the boot, the catch is configured to engage a surface of the inner housing to limit relative limit relative movement between the boot and the inner housing along the longitudinal axis to a first distance. The first distance may be minimal, such as substantially zero. The minimal to no axial movement keeps the outer housing in a position that does not cause the distal end portion of the latch arm to be depressed.

Another aspect of this disclosure is an optical connector comprising a connector sub-assembly that includes: a ferrule configured to support at least one optical fiber; a connector body surrounding at least a portion of the ferrule; and a latch arm extending outwardly and rearwardly from a front portion of the connector body, wherein an end portion the latch arm can be depressed toward the connector body. The optical connectors also comprises: an inner housing having a front side that receives a rear portion of the connector sub-assembly, wherein the inner housing is configured to allow the connector sub-assembly to be rotated relative to the inner housing about a connector sub-assembly axis while the rear portion is received by the inner housing; a boot extending from a rear side of the inner housing; and an outer housing coupled to the boot and extending over at least the end portion of the latch arm of the connector sub-assembly, wherein the outer housing and the boot are configured to rotate relative to each other about a longitudinal axis of the optical connector but move together along the longitudinal axis. The boot is rotatable relative to the inner housing about the longitudinal axis between a first rotational position and at least one other rotational position. In the first rotational position, relative movement between the boot and the inner housing along the longitudinal axis is limited so that the outer housing is configured to restrict the connector sub-assembly from rotating more than 90 degrees about the connector sub-assembly axis. In the at least one other rotational position, relative movement between the boot and the inner housing along the longitudinal axis is permitted so that the outer housing is configured to move axially rearward with the boot to a position where the outer housing does not restrict the connector sub-assembly from rotating more than 90 degrees about the connector sub-assembly axis.

Cable assemblies including optical connectors like those summarized above are also disclosed. A cable assembly may comprise a cable that includes at least one optical fiber, and an optical connector according to one or more of the preceding paragraphs may be secured to an end of the cable.

Various methods are also disclosed, including methods of removing an optical connector from an adapter. The optical connector in such methods may be one according to one or more paragraphs above. One such method comprises: rotating the boot relative to the inner housing about the longitudinal axis of the connector between the first rotational position and the second rotational position; and, with the boot in the second rotational position, moving the boot relative to the inner housing rearward along the longitudinal axis so that the outer housing moves axially rearward with the boot to depress the end portion of the latch arm of the connector sub-assembly.

As another example, methods of reversing polarity of an optical connector according to this disclosure are provided, particularly for embodiments where: the boot is rotatable relative to the inner housing about the longitudinal axis between a first rotational position and at least one other rotational position; and, in the first rotational position, relative movement between the boot and the inner housing along the longitudinal axis is limited so that the outer housing is configured to restrict the connector sub-assembly from rotating more than 90 degrees about the connector sub-assembly axis. One such method comprises rotating the boot relative to the inner housing about the longitudinal axis of the connector between the first rotational position and at least one other rotational position. With the boot in the at least one other position, the method further comprises moving the boot relative to the inner housing along the longitudinal axis so that the outer housing moves axially rearward with the boot to a position where the outer housing does not restrict the connector sub-assembly from rotating more than 90 degrees about the connector sub-assembly axis. The method also comprises rotating the connector sub-assembly approximately 180 degrees about the connector sub-assembly axis.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 1 is a perspective view of one embodiment of an end of an optical cable assembly that includes an optical connector according to this disclosure.

FIG. 2 is a side view of the optical connector of FIG. 1, partially shown in cross-section, with optical fibers of the cable assembly not shown to simplify the drawing.

FIG. 3 is a cross-sectional side view of a connector sub-assembly used in the optical connector of FIG. 1.

FIG. 10 is another perspective view of the optical connector of FIG. 1, showing the same components as FIG. 5, but from a different orientation and with the boot of the optical connector in a first rotational position that is considered a "locked" position.

FIG. 10A is a close-up perspective view of a portion of the optical connector shown in FIG. 10.

FIG. 11 is a perspective view similar to FIG. 10, but illustrates the boot of the optical connector in a second rotational position that is considered an "unlocked" position.

FIG. 11A is a close-up perspective view of a portion of the optical connector shown in FIG. 11.

FIG. 12 is another perspective view of the optical connector of FIG. 1, but with the boot and the outer housing moved axially rearward (i.e., retracted) relative to other components of the optical connector.

FIG. 13 is a side view of the optical connector of FIG. 1, partially shown in cross-section, with the boot and the outer housing in the retracted position of FIG. 12, and schematically illustrates how the outer housing is configured to depress latch arms of the connector sub-assemblies when moving to the retracted position.

FIGS. 17-23 are perspective views sequentially illustrating a process for reversing polarity of the optical connector of FIG. 1, with some the figures illustrating the outer housing of the optical connector as being transparent to aid understanding.

DETAILED DESCRIPTION

Figure 4:
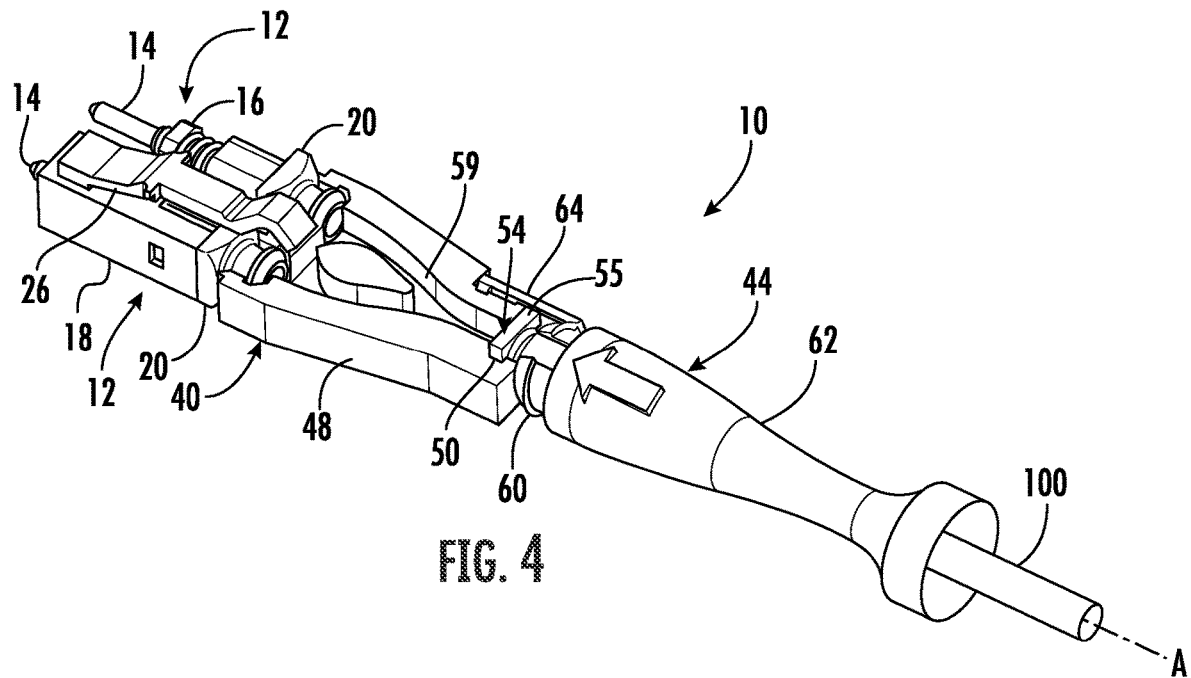
FIG. 4 is another perspective view of the optical connector of FIG. 1, but with various components of the optical connector not shown to better view a base of an inner housing and a boot of the optical connector.

Various embodiments will be further clarified by examples in the description below. In general, the description relates optical connectors and cable assemblies including the same. One example of an optical connector 10 (also referred to as "fiber optic connector 10", or simply "connector 10") is shown in FIGS. 1 and 2. The connector 10 is shown in the form of an LC duplex connector (e.g., according to IEC 61754-20:2012) having first and second LC connector sub-assemblies 12a, 12b. Reference number 12 will be used to generically refer to a connector sub-assembly for convenience in the remainder of this detailed description. Again, the connector 10 is merely an example, and persons skilled in optical connectivity will appreciate that features provided in this disclosure may apply to other connector designs, including LC simplex connectors, other types of simplex and duplex connectors, and multifiber connectors. As will be described in greater detail below, the connector 10 terminates a cable 100, and specifically optical fibers 102 (FIG. 6) carried by the cable 100, to form an end portion of a cable assembly 110.

As shown in FIGS. 1 and 2, the connector 10 extends along a longitudinal axis A, which is generally centered between the connector sub-assemblies 12 and runs along a length of the connector 10. The connector sub-assembles 12 each extend along a respective longitudinal axis L that is generally parallel to the longitudinal axis A. In this disclosure, references to components rotating refer to rotation about the longitudinal axis A or the longitudinal axis L, the context being clear which of the two is applicable. In simplex connector embodiments (not shown), the longitudinal axis A and the longitudinal axis L may be the same.

Additionally, as used in this disclosure, references to "axial movement," "moving axially," or the like refer to movement along or parallel to the longitudinal axis A. Furthermore, the terms "forward" and "rearward" (or "rear") are relative terms that generally use the orientation of the connector 10 as a reference. For example, a front of the connector 10 is defined by the connector sub-assemblies 12 (e.g., where the connector sub-assemblies 12 present ends of the optical fibers 102 for optical coupling with another connector or device), and a rear of the connector 10 is defined where the connector 10 stops extending over the cable 100. Thus, a forward direction is a direction from the rear of the connector 10 toward the front of the connector 10, along or parallel to the longitudinal axis A. A rearward or backward direction is a direction from the front of the connector 10 toward the rear of the connector 10, along or parallel to the longitudinal axis A. Various components are described in this disclosure as moving forward or rearward relative to one another, and/or moving axially forward or axially rearward.

As shown in FIG. 3, each connector sub-assembly 12 includes a ferrule 14 configured to support an optical fiber 102 (FIG. 6) and a connector body 18 (also referred to as "connector sub-assembly housing 18" or simply "housing 18") surrounding a portion of the ferrule 14. The ferrule 14 extends from a ferrule holder 16 that is retained in the connector body 18. In particular, internal geometry of the connector body 18 prevents the ferrule holder 16 from exiting a front of the connector body 18, and a rear stop component 20 prevents the ferrule holder 16 from exiting a rear of the connector body 18. A spring 22 biases the ferrule holder 16 forward within the connector body 18, away from the rear stop component 20, so that a front end of the ferrule 14 projects beyond the connector body 18. The front end of the ferrule 14 presents the optical fiber 102 for optical coupling with a mating component (e.g., another optical connector).

Each connector sub-assembly 12 also includes a latch arm 26 extending outwardly and rearwardly from a front portion of the connector body 18. Thus, the latch arm 26 has a proximal end 28 coupled to the front portion of the connector body 18, a distal end portion 30 spaced from the connector body 18, and latching features 32 (FIG. 1) between the proximal end 28 and distal end portion 30. The latch arm 26 may be depressed or otherwise flexed toward the connector body 18 to release the latching features 32 from engagement with corresponding latching features of an adapter (not shown in FIGS. 1-3). Thus, as used in this disclosure, references to the latch arm 26 depressing or being depressed refer to intentional movement of the latch arm 26 for assisting with or causing disengagement from an adapter. That is, depressing the latch arm 26 in this disclosure refers to actuation or movement for a desired purpose; something more than incidental flexing or movement of the latch arm 26 downward that would not affect engagement with an adapter or otherwise cause the latching features 32 to move a relevant amount. In some embodiments, the latch arm 26 may be formed integrally with the connector body 18 such that the latch arm 26 is configured to flex toward a main portion of the connector body 18. As will be described in greater detail below, in the embodiment shown, the distal end portion 30 of the latch arm 26 defines a ramp or actuation surface 34 to assist with removing the connector 10 from an adapter (e.g., adapter 80 in FIGS. 14-16).

FIGS. 1 and 2 illustrate how the connector 10 further includes an inner housing 40 that holds a rear portion of each connector sub-assembly 12, which in the embodiment shown is defined by the rear stop components 20. In alternative embodiments, the rear portions of the connector sub-assemblies may be defined by the connector bodies 18. The connector 10 also includes an outer housing 42 that extends over the inner housing 40 and the distal end portions 30 of the latch arms 26, and a strain relief assembly 44 ("boot 44") that is coupled to the outer housing 42 and that extends rearward from the inner housing 40. As will be described in greater detail below, the outer housing 42 and boot 44 are configured to move together in an axial direction, relative to the inner housing 40 (and remainder of the connector 10). Doing so causes an engagement surface 46 of the outer housing 42 to contact and move over the actuation surfaces 34 of the latch arms 26, which results in the distal end portions 30 of the latch arms 26 being depressed (pressed downward) so that the latch arms 26 flex toward the connector bodies 18. Before discussing these aspects further, additional details related to the inner housing 40, outer housing 42, and boot 44 will first be described.

Figure 5:
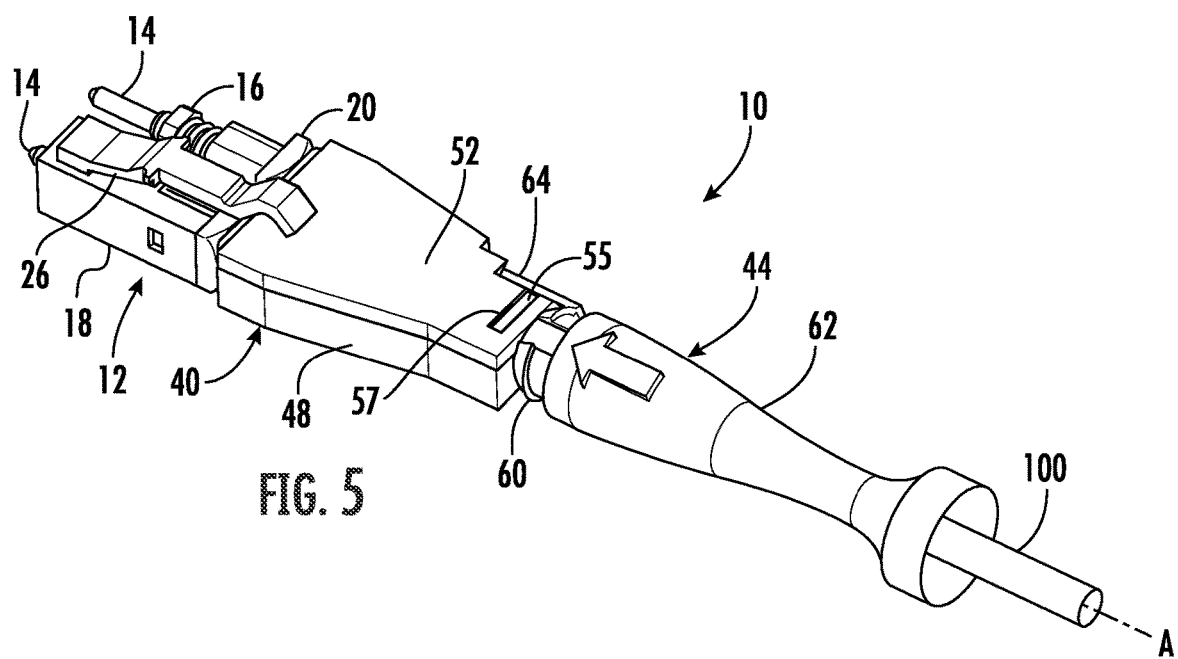
FIG. 5 is a perspective view similar to FIG. 4, but shows the inner housing of the optical connector including a cover/lid coupled to the base.

To this end, FIGS. 4 and 5 illustrate the connector 10 with the outer housing 42 hidden to better show internal components of the connector 10. The connector body 18 of one of the connector sub-assemblies 12 is also hidden from view. The inner housing 40 has a two-piece construction in the embodiment shown, comprising a base 48 and a cover 52 coupled to the base 48. The coupling may be achieved through any technique, including but not limited to using a snap-fit, an interference fit, and/or adhesive. The cover 52 is hidden in FIG. 4 such that only the base 48 is shown. The base 48 holds portions of the rear stop components 20 at a front side of the base 48 and a transition tube 54 at a rear side of the base 48. In some embodiments, the transition tube 54 may be a component to which strength members 108 (FIG. 6) of the cable 100 are crimped or otherwise secured.

Figure 6:
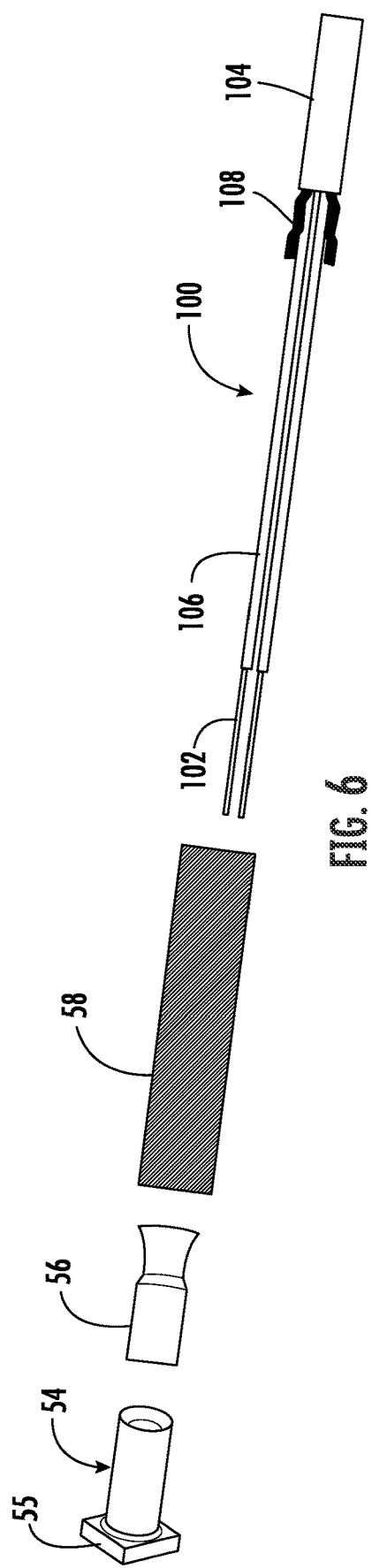
FIG. 6 is an exploded perspective view of an optical cable and various components of the optical connector of FIG. 1, namely a transition tube, crimp band, and heat shrink tube.
Figure 7:
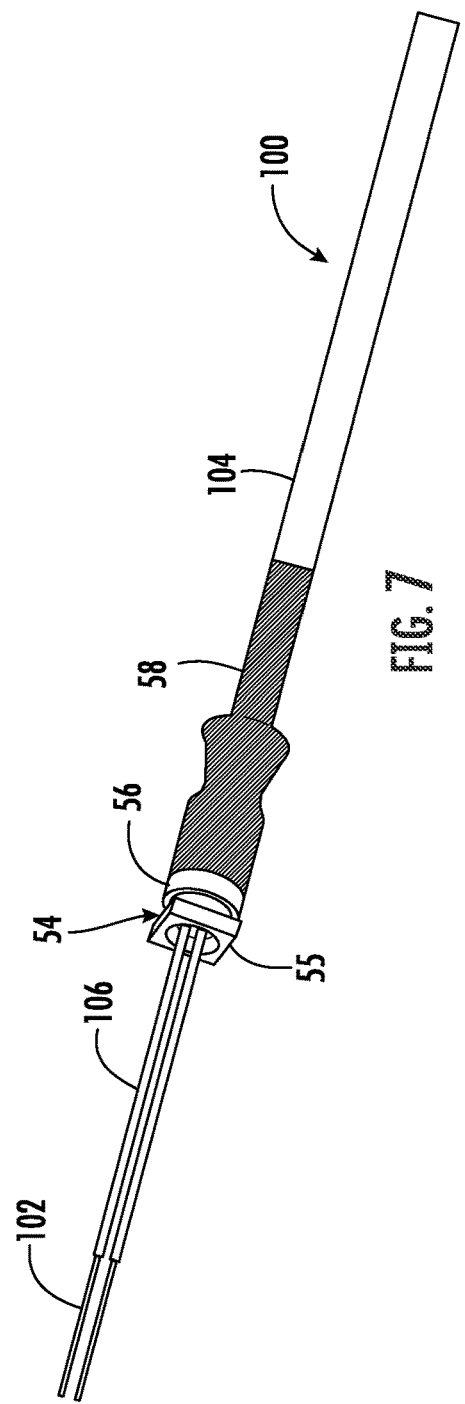
FIG. 7 is a perspective view illustrating the optical cable of FIG. 6 secured to the components of the optical connector that are shown in FIG. 6.

More specifically, and with additional reference to FIGS. 6 and 7, the transition tube 54 in the embodiment shown is generally cylindrical with a flange 55 defined at one end. The flange 55 is received in a cutout or slot 50 (FIG. 4) defined in the base 48 of the connector body 18 to couple the transition tube 54 to the rear of the base 48. The cover 52 of the inner housing 40 may also have a cutout or slot 57 (see FIG. 10A) to receive the flange 55 of the transition tube 54. FIG. 6 illustrates a crimp band 56 and heat shrink tube 58 for securing the cable 100 to the transition tube 54. The cable 100 is prepared so that two optical fibers 102 that are carried by the cable 100 extend a desired length from an end of a cable jacket 104. End sections of the optical fibers 102 are stripped of coating material 106 over a desired length such that the end sections comprise "bare glass" or "exposed glass" sections. The cable 100 is also prepared so that strength members 108, which may be in the form of aramid yarn, extend a desired length from the end of the cable jacket 104.

Although FIG. 6 illustrates the crimp band 56 and heat shrink tube 58 exploded from the cable 100, the heat shrink tube 58 and crimp band 56 are placed over the cable jacket 104 before or after preparing the cable 100. According to one example method, the transition tube 54 is advanced over the optical fibers 102 to be proximate the end of the cable jacket 104, at which point the strength members 108 are flared over a rear portion of the transition tube 54. The crimp band 56 is then slid forward from the cable jacket 104 to extend over the rear portion of the transition tube 54 and the flared-out strength members 108, at which point the crimp band 56 is crimped onto the transition tube 54 to secure the strength members 108 (and, therefore, cable 100) to the transition tube 54. Finally, the heat shrink tube 58 is advanced to be positioned over at least a portion of the crimp band 56 and an end portion of the cable jacket 104. The heat shrink tube 58 is then activated (i.e., heated) to shrink down over the interface between the cable 100 and connector components, resulting in the arrangement shown in FIG. 7. The transition tube 54 is then coupled to the base 48 of the connector body 18 in the manner described above. Thus, in the example described above and other embodiments, if desired, the cable 100 may be secured to the transition tube 54 independently from other connector components. In alternative embodiments, however, the transition tube 54 may be coupled to the connector body 18 prior to securing the cable 100 to the transition tube 54.

Referring back to FIG. 4, channels or troughs 59 are defined by the base 48 so that the optical fibers 102 (FIG. 6) from the cable 100 can be routed within the base 48 to the connector sub-assemblies 12. Specifically, two optical fibers 102 may extend from the cable 100 and through the transition tube 54 into the base 48, with each optical fiber 102 then extending within the base 48 (in one of the channels 59) to a respective one of the connector sub-assemblies 12 at the front side of the base 48. The cover 52 may be coupled to the base 48 by a snap-fit, adhesive, fasteners, or any other suitable coupling technique, resulting in the channels 59 being within an interior of the inner housing 40.

Figure 8:
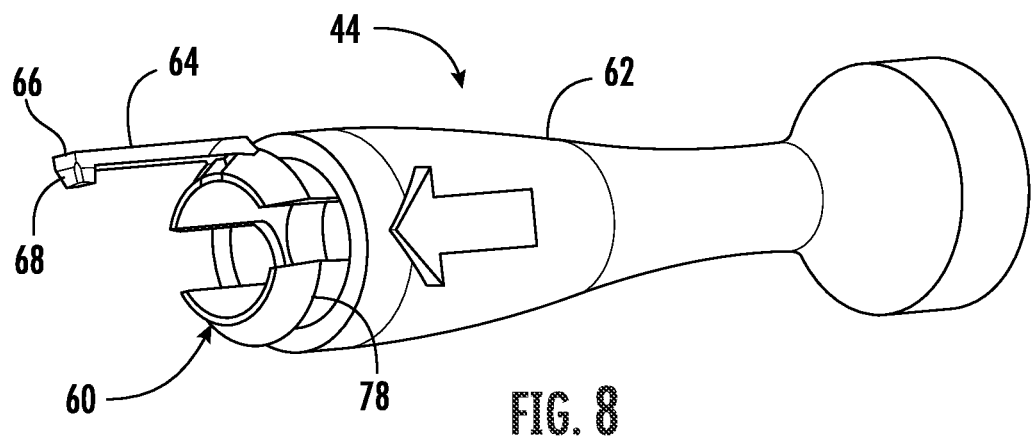
FIG. 8 is a perspective view of the boot of the optical connector of FIG. 1, wherein the boot includes a substrate component and a strain relief component assembled together.
Figure 9:
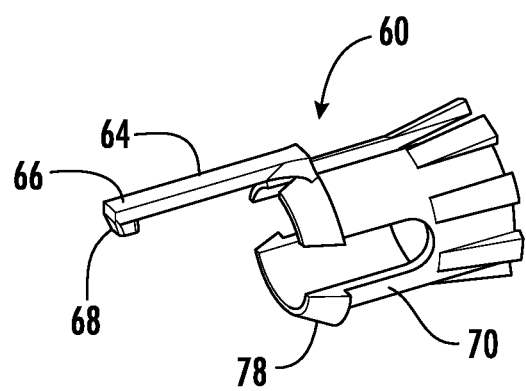
FIG. 9 is a perspective view of the substrate component of the boot in isolation.

The boot 44 in the embodiment shown comprises a substrate 60 (also referred to as locking component 60) and a strain relief component 62 that are coupled together, which can be better understood with additional reference to FIGS. 8 and 9. As shown in FIGS. 8 and 9, the substrate 60 includes a locking arm 64 that has a terminal end portion 66 defining a catch 68, which may also referred to as a latch. The locking arm 64 extends from a base portion 70 of the substrate 60, which may be generally cylindrical. The strain relief component 62 is received over at least some length of the base portion 70 of the substrate 60. The substrate 60 and strain relief component 62 may be formed from respective first and second materials, with the second material being less rigid than the first material. For example, in some embodiments the second material may be an elastomer, such as thermoplastic polyurethane, and the first material may be something having a higher modulus of elasticity and/or shear modulus, such as a polycarbonate or metal. The strain relief component 62 may be overmolded onto the base portion 70 of the substrate 60 or coupled to the base portion 70 by a friction/interference fit so that the substrate 60 and strain relief component 62 together function as an assembled unit. Similar two-piece strain relief assembly (i.e., boot) designs and associated advantages are disclosed in U.S. Pat. Nos. 9,551,842 and 10,261,268, the disclosure of such strain relief assembly designs being incorporated herein by reference.

Referring back to FIGS. 4 and 5, the substrate 60 is received over a rear portion of the transition tube 54 and is generally behind rear side of the inner housing 40, except that the locking arm 64 of the substrate 60 extends over a portion of the inner housing 40. The boot 44 can be rotated about the longitudinal axis A of the connector 10 to move the locking arm 64 to different positions on the inner housing 40, with some positions allowing rearward movement of the boot 44 relative to the inner housing 40 along the longitudinal axis A.

In particular, FIGS. 10 and 10A illustrate how the catch 68 (obstructed from view) on the terminal end portion 66 of the locking arm 64 may be received in a first slot 72 defined on an exterior of the inner housing 40. The first slot 72 and the catch 68 are designed similar in size so that there is little to no freedom for the locking arm 64 (and, therefore, the boot 44) to move axially relative to the inner housing 40 (and, therefore, not move relative to the connector sub-assemblies 12). The first slot 72 and catch 68 are also shaped to inhibit the catch 68 from sliding out of the first slot 72 in an axial direction. The catch 68 instead is configured to engage a rear surface of the first slot 72 and thereby prevent the boot 44 from moving rearward along the longitudinal axis A relative to the inner housing 40. The position of the boot 44 in FIGS. 10 and 10A is referred to in this disclosure as a "first rotational position" or "locked position." One of the sidewalls of the first slot 72 defines a radial flat that blocks the catch 68 from rotating clockwise about the longitudinal axis A in FIGS. 10 and 10A. In other words, the first slot 72 is designed to prevent the boot 44 from rotating beyond the first rotational position in one direction about the longitudinal axis A. The boot 44, however, may be able to rotate in an opposite direction about the longitudinal axis A.

In particular, and as shown in FIGS. 11 and 11A, the boot 44 may be rotated about the longitudinal axis A so that the catch 68 (still obstructed from view) on the terminal end portion 66 of the locking arm 64 is received in a second slot 74 defined on the exterior of the inner housing 40. The rotation relative to the inner housing 40 may be possible by way of a circumferentially-extending slot (not shown) interconnecting the first and second slots 72, 74, or by way of shaping the catch 68 and the first slot 72 in a manner intended to allow the relative rotation. For example, one of the sidewalls of the first and slot 72 may be angled to act as a ramp so that the catch 68 of the locking arm 64 can slide out of the first slot 72 when the boot 44 is rotated in a direction toward the second rotational position. The catch 68 may also be shaped with angled sidewalls. Additionally, the locking arm 64 is elongated and may be configured to flex radially outward in such embodiments to help allow the catch 68 to travel out of the first slot 72 and onto the surface of the inner housing 40 that is between the first and second slots 72, 74, when the boot 44 is rotated in a direction toward the second rotational position.

In the embodiment shown, the second slot 74 is elongated in the axial direction relative to the first slot 72. As a result, and as will be discussed below with reference to FIGS. 12 and 13, the locking arm 64 (and, therefore, the boot 44) can move axially rearward at least a certain distance relative to the inner housing 40 (and, therefore, relative to the connector sub-assemblies 12). The distance is sufficient for the boot 44 to move the outer housing 42 (which is coupled to be the boot 44) rearward enough to depress the distal end portions 30 of the latch arms 26, as will be described further below. In the embodiment shown in FIGS. 11 and 11A, eventually the catch 68 of the locking arm 64 engages a surface of the inner housing 40 that defines an end of the second slot 74 to stop further axial movement. The rotational position of the boot 44 in FIGS. 11 and 11A is referred to in this disclosure as a "second rotational position" or "unlocked position."

As can be appreciated from the discussion above, the boot 44 is movable relative to the inner housing 40 between a first rotational, locked position and a second rotational, unlocked position, with the latter permitting the boot 44 to move axially relative to the inner housing 40. The outer housing 42 (FIG. 2) is coupled to the boot 44 in a manner that: (a) allows at least some relative rotation between the boot 44 and the outer housing 42, yet (b) prevents or substantially constrains relative axial movement between the boot 44 and the outer housing 42. The substrate 60, for example, may extend through an opening 82 (FIG. 1) in a rear wall 76 of the outer housing 42 that allows for the boot 44 to move from the first rotational position to the second rotational position without also causing the outer housing 42 to rotate. The rear wall 76, however, may be retained between an end of the strain relief component 62 and a flange 78 (FIGS. 2 and 13) defined by the substrate 60, effectively "sandwiched" between them to prevent or substantially constrain relative axial movement.

FIGS. 12 and 13 illustrate moving the boot 44 and outer housing 42 together in an axial direction when the boot 44 is in the second rotational, unlocked position. The axial movement is relative to the remainder of the connector 10 so that the outer housing 42 actuates the latch arms 26 of the connector sub-assemblies 12. In particular, when the boot 44 is in the second rotational position and moved axially rearward (i.e., retracted) relative to the inner housing 40, the outer housing 42 moves together with the boot 44 as discussed above. This movement can occur relative to not just the inner housing 40, but also the remainder of the connector 10, including the connector sub-assemblies 12. As a result, the engagement surface 46 of the outer housing 42 contacts the actuation surfaces 34 on the distal end portions 30 of the latch arms 26. The latch arms 26 flex toward the main portion of the connector body 18 to accommodate the engagement surface 46 moving over the actuation surfaces 34, as schematically illustrated in FIG. 13. This flexing/depressing of the latch arms 26 may be sufficient to release engagement between the latching features 32 (FIG. 1) of the latch arms 26 and latching features (not shown) inside an adapter.

Figure 14:
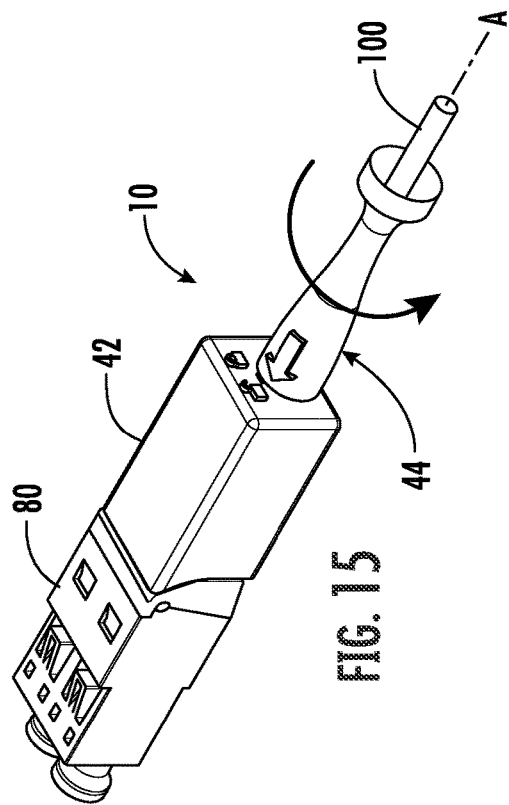
FIG. 14 is a perspective view showing the optical connector of FIG. 1 mated with an adapter, with the boot of the optical connector in the first rotational position.
Figure 15:
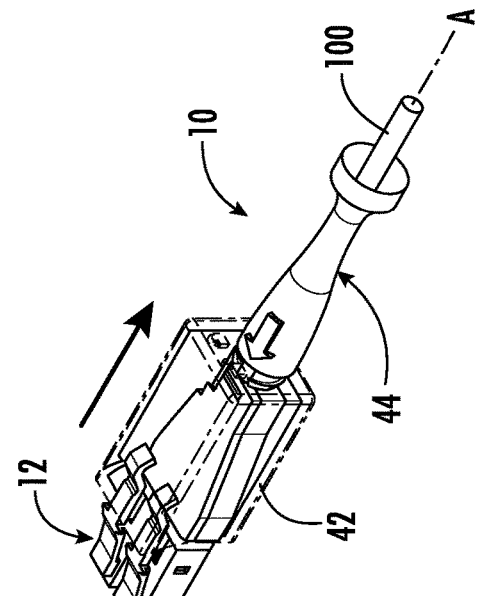
FIG. 15 is a perspective view similar to FIG. 14, but illustrates the boot of the optical connector rotated about a longitudinal axis of the optical connector to the second rotational position.
Figure 16:
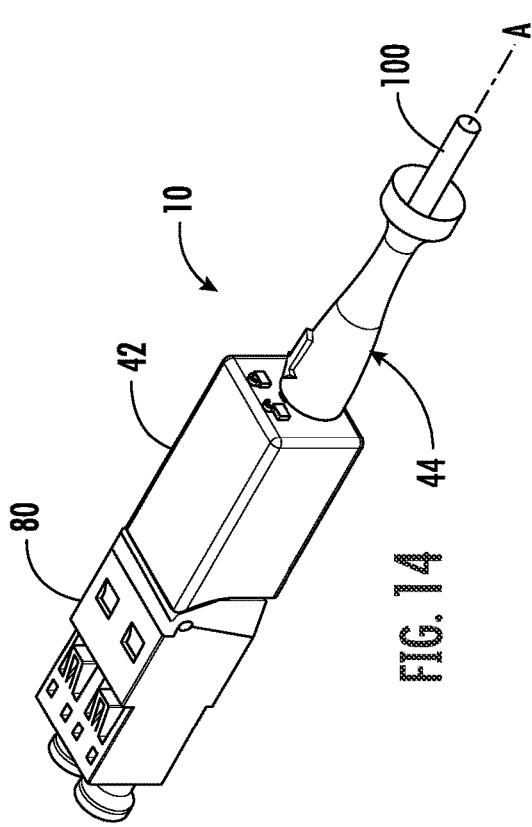
FIG. 16 is a perspective similar to FIG. 15, but illustrates the optical connector removed/disengaged from the adapter.

To this end, FIGS. 14-16 illustrate one example of how the connector 10 may operate. In FIG. 14, the connector 10 is shown as being mated to an adapter 80. The latching features 32 (FIG. 1) of the connector sub-assemblies 12 engage corresponding latching features (not shown) of the adapter 80 to secure the connector 10 to the adapter 80. Such engagement for LC connectors is well-known and will not be described in further detail. The boot 44 is in the first rotational, locked position in FIG. 14 such that pulling the boot 44 rearward relative to the inner housing 40 is prevented or very limited for the reasons discussed above with reference to FIGS. 10 and 10A. Such pulling does not result in the outer housing 42 depressing the latch arms 26 of the connector sub-assemblies 12. The same is true if the outer housing 42 is pulled rearward since the outer housing 42 is only configured to move axially when the boot 44 moves axially.

In FIG. 15, the boot 44 is rotated to the second rotational, unlocked position discussed above with reference to FIGS. 11 and 11A. In this position, the boot 44 can then be moved axially rearward relative to the inner housing 40. In the embodiment shown, the second slot 74 (FIG. 11A) is designed to allow sufficient axial movement for the outer housing 42 to depress the latch arms 26 of the connector sub-assemblies 12, as discussed above with reference to FIGS. 12 and 13. The flexing of the latch arms 26 disengages their respective latching features 32 (FIG. 1) from the latching features of the adapter 80. Thus, the connector 10 may then be removed from the adapter 80 by further pulling the boot 44 away from the adapter 80, as shown in FIG. 16. The outer housing 42 can be pulled with the boot 44 or instead of the boot 44 to have the same effect when the boot 44 is in the second rotational position.

Advantageously, in some embodiments the connector 10 may include the ability to reverse polarity. For example, if one of the connector sub-assemblies 12 is designed as "A" and the other designated as "B", the connector 10 may have either an A-B configuration or B-A configuration relative to a given orientation of the connector 10. Which connector sub-assembly 12 is on which side (i.e., left or right) of the connector 10 in the given orientation can be reversed. An example way to achieve this functionality is for the boot 44 to be further configured to rotate relative to the inner housing 40 to a third rotational position (also referred to in this disclosure as a "free position"). This can be better understood with reference back to FIGS. 10A and 11A.

As shown FIGS. 10A and 11A, the inner housing 40 in the embodiment shown defines an outer surface 84 adjacent the second slot 74. The boot 44 may be rotated relative to the inner housing 40 so that the locking arm 64 extends over the outer surface 84. As with rotation of the boot 44 from the first rotational position to the second rotational position, such rotation to the third rotational position may be possible by shaping the catch 68 on the terminal end portion 66 of the locking arm 64 and/or sidewalls of the second slot 74 in a manner intended to allow the relative movement. For example, a sidewall of the second slot 74 may be angled to act as a ramp so that the catch 68 of the locking arm 64 can slide out of the second slot 74 when the boot 44 is further rotated. FIG. 10A shows how only a portion of a sidewall 88 of the second slot 74 may be configured in this manner, although in other embodiments not shown an entire length of the sidewall 88 may be configured in this manner. An advantage of the embodiment shown is that the second slot 74 prevents the locking arm 64 from rotating to the third rotational position until the boot 44 is moved rearward so that the catch 68 of the locking arm 64 is positioned in the end of the second slot 74, next to the portion of the sidewall 88 that is angled or otherwise configured to allow the rotation. In other words, the boot 44 in the embodiment shown must be pulled back some distance before the boot 44 can be rotated to the third rotational position. The catch 68 may also be shaped with angled sidewalls to facilitate movement between the first, second, and third rotational positions.

The rotation of the boot 44 from the second rotational position to the third rotational position occurs relative to the outer housing 42. More specifically, the opening 82 (FIG. 1) in the rear wall 76 of the outer housing 42 is shaped or otherwise configured to allow for such relative rotation. Further rotation of the boot 44 beyond the third rotational position results in the outer housing 42 rotating together with boot 44 about the longitudinal axis A, as will be described in greater detail below. Initially, however, in the third rotational position of the boot 44, the locking arm 64 extends over the outer surface 84 of the inner housing 40. At this point there is a limit to rotating the boot 44 further beyond the third rotational position because the outer surface 84 is shaped to block the locking arm 64 from rotating further.

It is possible in the embodiment shown to move the outer housing 42 and boot 44 rearward relative to the inner housing 40 when the boot 44 is in the third rotational position. The terminal end portion 66 of the locking arm 64 travels over or slides along the outer surface 84 during such movement. In some embodiments, the boot 44 can be moved completely off the inner housing 40 without any interference. In other embodiments, the substrate 60 may be designed so that the catch 68 or some other portion of the locking arm 64 is received in the slot 57 or otherwise encounters some interference from a portion of the inner housing 40. The interference may be small enough to be easily overcome by applying additional force when pulling the boot 44 rearward relative to the inner housing 40. To this end, the interference in such embodiments may only be for providing a user with some tactile feedback before moving the boot 44 off the inner housing 40.

In the example embodiment shown, the ability to rotate to the third rotational position where the outer housing 42 and boot 44 can be moved further rearward allows polarity to be reversed as illustrated in FIGS. 17-23. The process for reversing polarity involves rotating the connector sub-assemblies 12 about their respective connector sub-assembly axes L. During normal use of the connector 10, the outer housing 42 prevents such rotation. In other words, even though the connector sub-assemblies 12 may be received in the front side of the inner housing 40 in a manner that allows the connector sub-assemblies 12 to rotate relative to the inner housing 40 about the respective connector sub-assembly axes L, the outer housing 42 normally extends over the latch arms 26 and is shaped with sidewalls or other geometry to normally prevent such rotation. The rotation may be prevented completely or partially (e.g., not permitting rotation more than 90 degrees) prior to retracting the outer housing 42. The first or second rotational position of the boot 44 may not allow the boot 44 and outer housing 42 to move sufficiently rearward to allow the rotation of the connector sub-assemblies 12, but the third rotational position of the boot 44 may do so.

Figure 17:
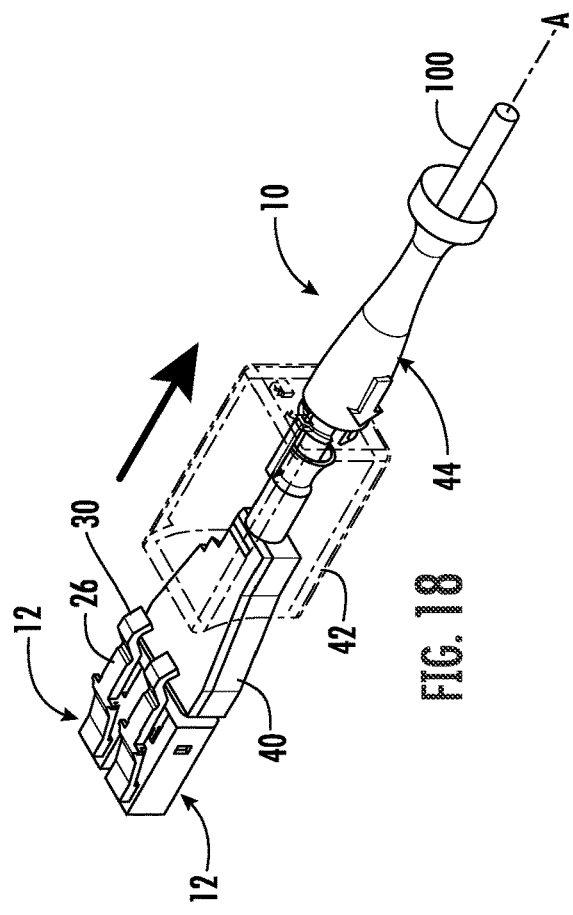
Figure 18:
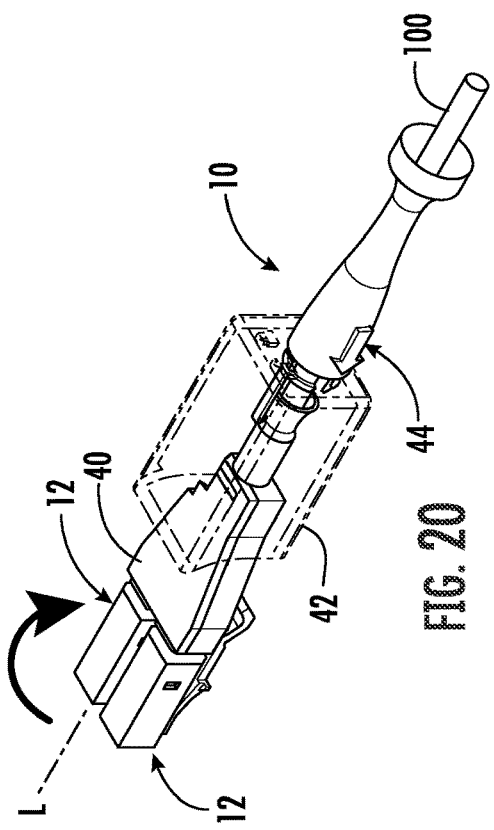

Thus, in the embodiment shown, the process for reversing polarity begins with rotating the boot 44 relative to the inner housing 40 to the third rotational position, as shown in FIG. 17. The boot 44 can then be pulled back (moved axially rearward) relative to the inner housing 40. The outer housing 42 is coupled to the boot 44 in the manner described above and, therefore, moves axially with the boot 44. FIG. 18 illustrates the boot 44 and outer housing 42 in an exaggerated, axially-rearward position merely to provide better visualization. The outer housing 42 no longer extends over the distal end portions 30 of the latch arms 26 after moving the boot 44 and outer housing 42 rearward some distance.

Figure 19:
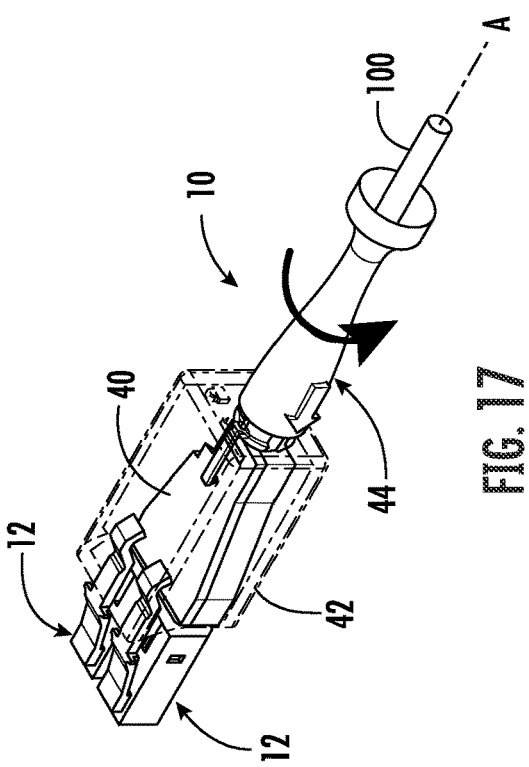
Figure 20:
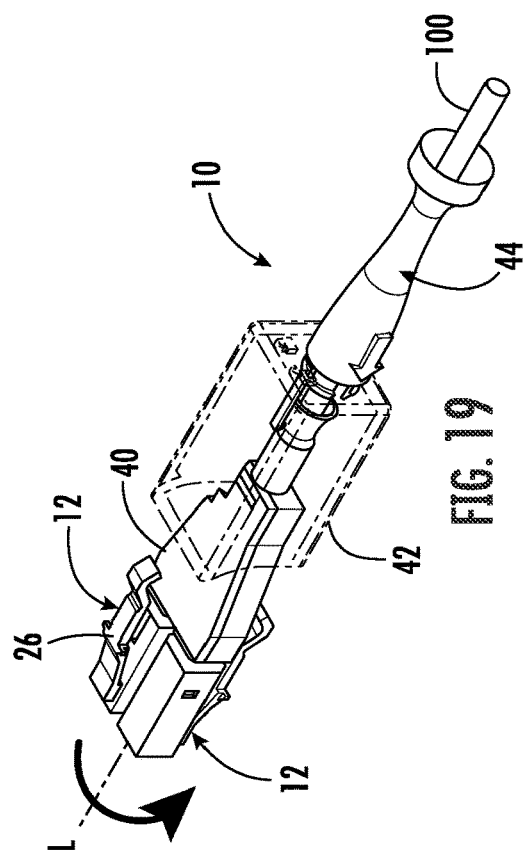

As shown in FIGS. 19 and 20, when the outer housing 42 no longer extends over the distal end portions 30 of the latch arms 26, the outer housing 42 no longer prevents the connector sub-assemblies 12 from rotating more than 90 degrees about their respective connector sub-assembly axes L. Indeed, as shown, at this point the connector sub-assemblies 12 may be rotated about their respective longitudinal axes L by 180 degrees to be oriented on an opposite side of the connector 10. The inner housing 40 receives the rear stop components 20 in a manner that allows such rotation in situ. In other words, the rear stop components 20 do not need to be removed from the inner housing 40 to rotate 180 degrees relative to the inner housing 40. The outer housing 42 can remain in a sufficiently rearward position to not interfere with the rotation of the connector sub-assemblies 12.

Now referring to FIG. 21, the outer housing 42 and boot 44 can then be rotated 180 degrees about the longitudinal axis A relative to the inner housing 40. The outer housing 42 and boot 44 may rotate together to the opposite side of the connector 10 due the opening 82 (FIG. 1) in the rear wall 76 of the outer housing including a flange or similar structure that prevents the substrate 60 of the boot 44 from further rotating relative to the outer housing 42. In other words, a surface on the substrate 60 may come into contact with a surface in the opening upon rotating to the third rotational position, and then additional relative rotation beyond the third position in one direction (e.g., clockwise in FIG. 21) is not permitted. However, alternative embodiments are also possible where the outer housing 42 and boot 44 are rotated to the opposite side of the connector 10 separately.

Once rotated to the opposite side of the connector 10, the outer housing 42 and boot 44 can be moved axially forward until the substrate 60 of the boot 44 abuts the rear side of the inner housing 40. FIG. 21 illustrates the connector 10 after such movement. The entire connector 10 can then be turned over (rotated 180 degrees about the longitudinal axis A), as shown in FIG. 22. Finally, as schematically shown in FIG. 23, the boot 44 can then be rotated about the longitudinal axis A from the third rotational position to the second rotational (unlocked) position or the first rotational (locked) position. The inner housing 40 is designed to provide locked and unlocked positions on each side of the inner housing 40. In other words, the first and second slots 72, 74 discussed above with reference to FIGS. 10A and 11A are also provided on an opposite side of the inner housing 40.

Figure 24:
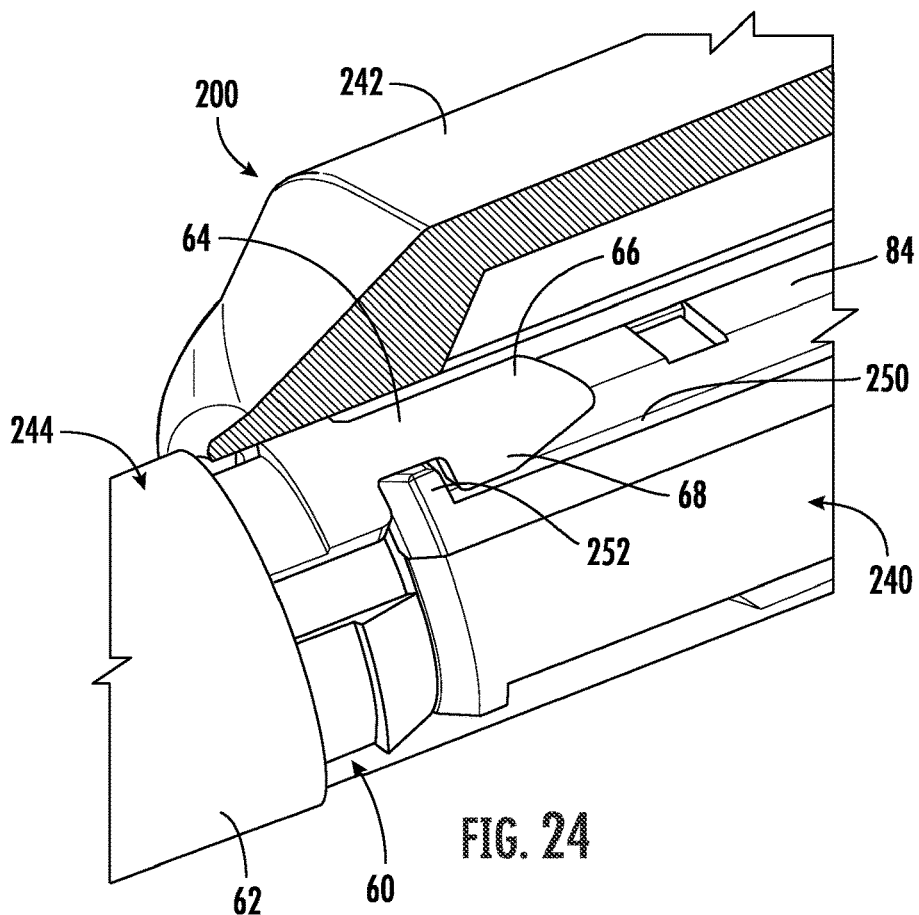
FIG. 24 is a perspective a portion of an optical connector according to another embodiment of this disclosure, wherein an outer housing of the optical connector in the illustrated embodiment is shown partially cut-away to better visualize engagement between the boot and the inner housing of the illustrated embodiment, and wherein the boot is in a first rotation position that represents a locked position.

In alternative embodiments, the number of steps to reverse polarity may be reduced even further. For example, FIG. 24 illustrates a portion of a connector 200 according to another embodiment of this disclosure. The connector 200 still includes an inner housing 240, outer housing 242, and boot 244 like the connector 10, except that the components in the embodiment shown in FIG. 24 are designed with different geometries. Similar reference numbers are used to refer to elements on these components that correspond to the same elements on the components of the connector 10.

As shown in FIG. 24, the inner housing 240 may be designed with a rear portion that is generally cylindrical, but with a truncated top and bottom. Additionally, an axially-extending ridge 250 is provided adjacent the truncated top, with the ridge 250 terminating at a rear flange 252 of the inner housing 240. Although hidden from view, the inner housing 240 may have a similar geometry on the opposite side of the connector 200. The ridge 250 and rear flange 252 function in a manner similar to the first slot 72 (FIGS. 10A and 11A) on the inner housing 40 of connector 10, as will be apparent below.

Still referring to FIG. 24, the substrate in the embodiment shown still includes the locking arm 64 extending over the rear side of the inner housing 240, but the terminal end portion 66 is shaped to provide the locking arm 64 with a hook-like configuration. The catch 68 in this embodiment is an overhang or lateral extension of the locking arm 64 that is received in the space between the outer surface 84 of the inner housing 240 and the ridge 250. FIG. 24 illustrates the boot 244 in the first rotational, locked position. The boot 244 is prevented from being pulled back axially due to the rear flange 252 blocking the catch 68. In some embodiments there may some minimal axial movement from a forward-most position of the boot 244 on the inner housing 240, but not sufficient movement for the boot 244 to cause the outer housing 242 to depress the latch arms 26 (not shown in FIG. 24) of the connector 200 in a way that would cause the connector 200 to disengage from an adapter.

Figure 25:
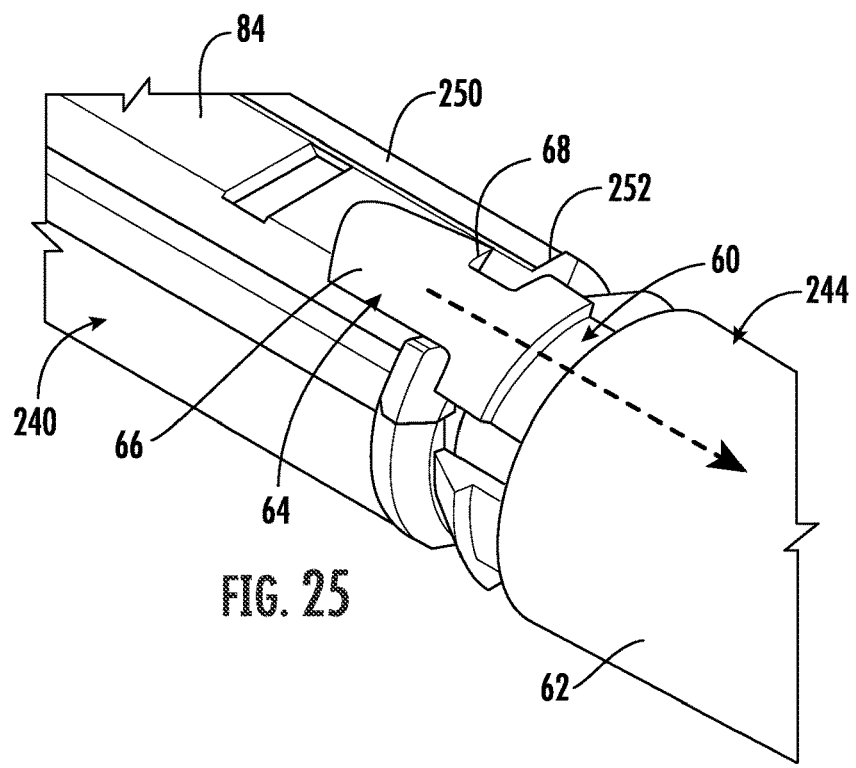
FIG. 25 is a perspective view similar to FIG. 24, but omits the outer housing and illustrates the boot rotated to a second rotational position that represents an unlocked position.

Similar to the boot 44 of the connector 10, the boot 244 can be rotated to a second, unlocked position. FIG. 25 illustrates the inner housing 240 and boot 244 after such rotation. The outer housing 242 is not shown to simplify the drawing, but similar to the connector 10, the opening 82 in the rear wall 76 of the outer housing 242 is configured to allow relative rotation of the boot 244 to the second rotational position. The outer housing 242 and boot 244 can be moved together axially when the boot 244 is in the second rotational position, thereby causing the outer housing 242 to depress the latch arms 26 like the outer housing 42.

Unlike the connector 10, however, the connector 200 is configured so that the inner housing 240 does not prevent the boot 244 from being moved rearward off of the inner housing 240 when the boot 244 is in the second rotational position. The outer housing 242 and boot 244 may therefore be moved back axially a sufficient distance to not only depress the latch arms 26 (FIGS. 26-27), but also allow polarity of the connector 200 to be reversed. The connector 200 is therefore an example of an embodiment that does not require rotation of a boot to a third rotational position to reverse polarity.

Figure 27:
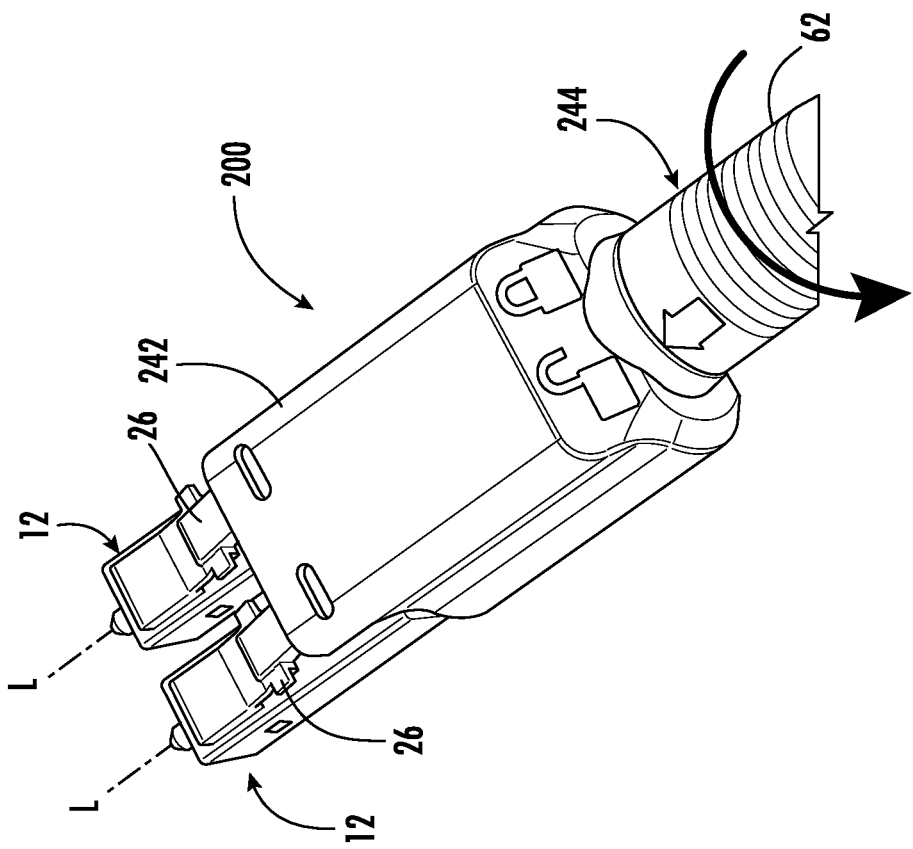
FIG. 27 is a perspective view of the optical connector of FIG. 26 after rotating the boot to the unlocked position.
Figure 26:
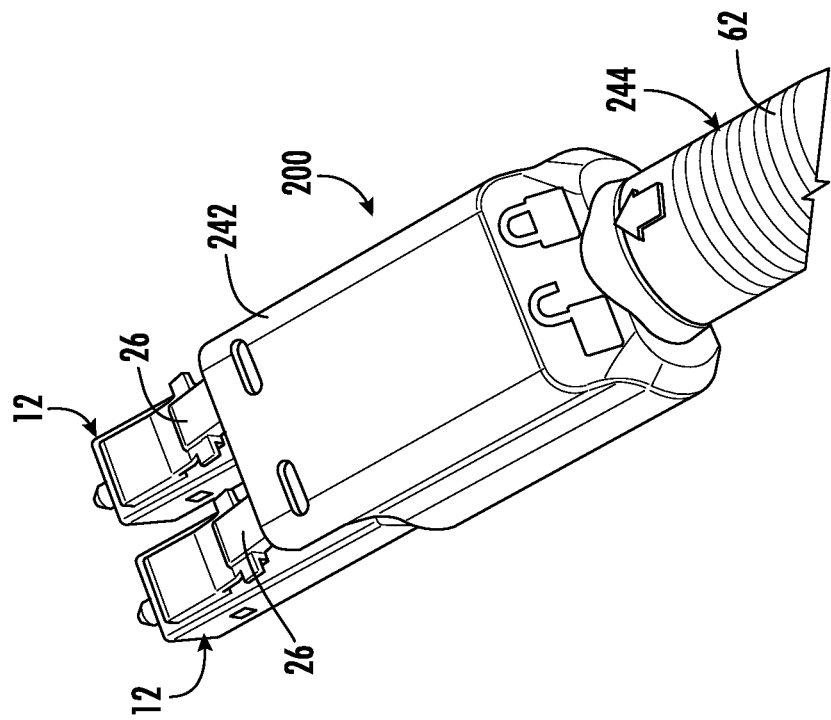
FIG. 26 is a perspective view of an example optical connector that may correspond to the optical connector whose components are illustrated in FIGS. 24 and 25, wherein the optical connector is illustrated with the boot in the locked position.
Figure 28:
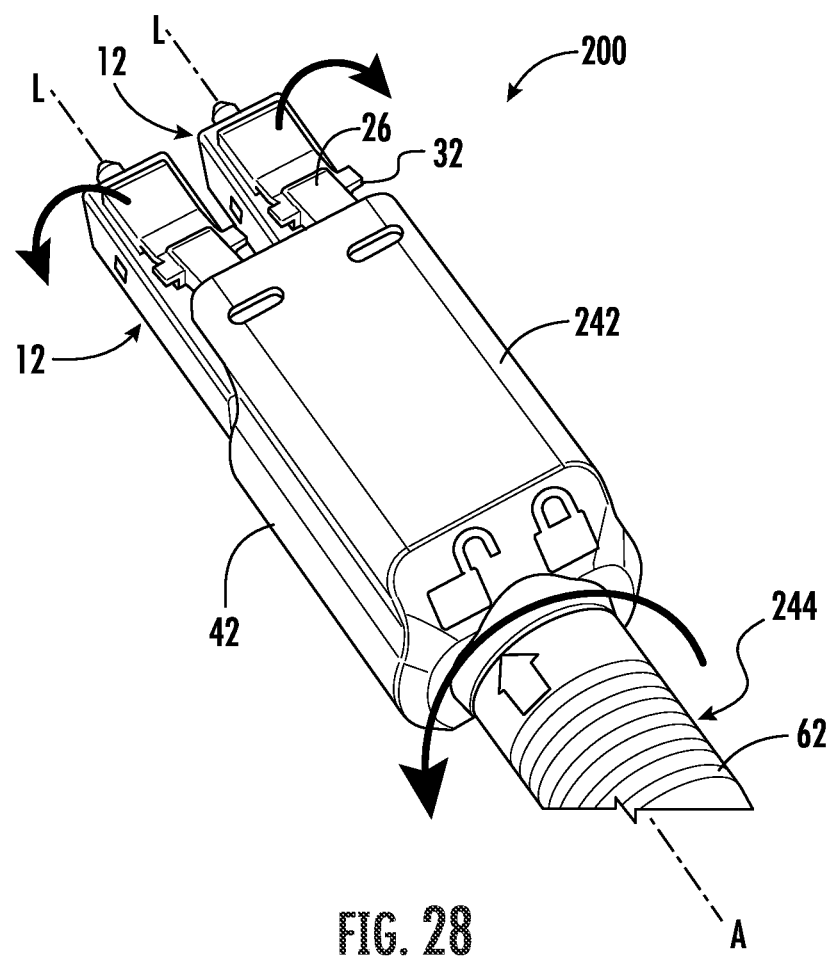
FIG. 28 is a perspective view similar to FIG. 27, but includes various arrows as annotations to schematically represent steps to reverse polarity of the optical connector.

Aspects of the connector 200 can be better appreciated with reference to FIGS. 26-28. Again, similar reference numbers are used to refer to similar components or portions thereof from the connector 10. FIG. 26 illustrates the connector 200 with the boot 244 in the first rotational position (locked position), and therefore corresponds to FIG. 24. The outer housing 242 and boot 244 are prevented from being pulled back in the manner described above with reference to FIG. 24. FIG. 27 illustrates the connector 200 after rotating the boot 244 to the second rotational position (unlocked position), and therefore corresponds to FIG. 25. The outer housing 242 and boot 244 can be moved together rearward at this point to depress the latch arms 26. The outer housing 242 and boot 244 can even be moved sufficiently rearward so that the outer housing 242 does not extend over the distal end portions 30 of the latch arms 26.

FIG. 28 schematically illustrates how the outer housing 242 is configured to allow the connector sub-assemblies 12 to rotate 180 degrees about their respective longitudinal axes L when the boot 44 is in the second rotational, unlocked position. In some embodiments, the outer housing 144 may be shaped to allow such rotation without being pulled back axially, and in other embodiments the outer housing 242 and boot 244 may need to be pulled back to allow such rotation. For example, some embodiments may require the outer housing 242 to be pulled back to no longer extend over the distal end portions 30 of the latch arms 26 in order to be able to rotate the connector sub-assemblies 12.

The outer housing 242 and boot 244 are pulled back at least some distance before rotating the outer housing 242 and boot 244 to the opposite side of the connector 200. As can be appreciated from FIG. 25, some embodiments may require the substrate 60 of the boot 244 to be pulled off the rear portion of the inner housing 240 before the boot 244 can be rotated 180 degrees. The outer housing 242 may be configured to rotate together with the boot 244, as was discussed above for the connector 10, or may be configured to rotate independently.

After being rotated 180 degrees, the outer housing 242 and boot 244 may then be moved forward to a normal operating position, similar to one the components were in prior to reversing the polarity of the connector 200. Advantageously, the terminal end portion 66 of the locking arm 64 in the embodiment shown in FIG. 25 is shaped with inclined/ramped surfaces that converge towards a tip. This geometry helps direct the substrate 60 to the second rotational position when moving the locking arm 64 back over the rear portion of the inner housing 240. For example, if the boot 244 has been rotated slightly less than 180 degrees, the locking arm 64 may not be aligned properly to advance forward past the rear flange. Additionally, if the outer housing 242 was rotated together with the boot 244, the outer housing 242 may not be properly aligned to advance over the latch arms 26 of the connector sub-assemblies 12. When advancing the outer housing 242 and boot 244 forward in this situation, one of the ramped surfaces of the terminal end portion 66 of the locking arm 64 may contact the rear flange and cause the locking arm 64 to rotate to the correct, aligned position as the advancement continues. In other words, the terminal end portion 66 of the locking arm 64 may be shaped to self-correct misalignment from the intended position (i.e., second rotational position).

It will be apparent to those skilled in optical connectivity that various modifications and variations can be made based on this disclosure. For example, although the example connector 10 described above and shown in the figures is in the form of an LC duplex uniboot connector, various features disclosed may be applicable to different connector configurations and different connector sub-assembly designs. This includes simplex configurations of LC connectors (e.g., which may include a rotatable boot), and both simplex and duplex configurations of different (i.e., non-LC) connector designs. Indeed, in the claims that follow, the use of "a" or "an" in connection with an element (e.g., a connector sub-assembly) refers to "one or more" of the element unless explicitly stated otherwise.

What is claimed is:

1. An optical connector, comprising:
   a connector sub-assembly including:
      a ferrule configured to support at least one optical fiber;
      a connector body surrounding at least a portion of the ferrule; and
      a latch arm extending outwardly and rearwardly from a front portion of the connector body, wherein an end portion of the latch arm can be depressed toward the connector body;
   an inner housing having a front side in which a rear portion of the connector sub-assembly is received;
   a boot extending from a rear side of the inner housing; and
   an outer housing coupled to the boot and extending over at least the end portion of the latch arm of the connector sub-assembly, wherein the outer housing and the boot are configured to rotate relative to each other about a longitudinal axis of the optical connector but move together along the longitudinal axis;
   wherein:
      the boot is rotatable relative to the inner housing about the longitudinal axis between a first rotational position and a second rotational position;
      in the first rotational position, relative movement between the boot and the inner housing along the longitudinal axis is limited so that the outer housing is not configured to move axially rearward with the boot to depress the end portion of the latch arm; and
      in the second position, relative movement between the boot and the inner housing along the longitudinal axis is permitted so that the outer housing is configured to move axially rearward with the boot to depress the end portion of the latch arm.

2. The optical connector of claim 1, wherein the connector sub-assembly is a first connector sub-assembly, and wherein the optical connector further comprises a second connector sub-assembly having a rear portion received in the front side of the inner housing, wherein the second connector sub-assembly has a construction similar to the first connector sub-assembly.

3. The optical connector of claim 1, wherein the rear portion of the connector sub-assembly is received in the front side of inner housing in a manner that allows the connector sub-assembly to be rotated relative to the inner housing about a connector sub-assembly axis.

4. The optical connector of claim 3, further wherein:
   in the first rotational position, the outer housing is configured to restrict the connector sub-assembly from rotating more than 90 degrees about the connector sub-assembly axis.

5. The optical connector of claim 4, further wherein:
in the second rotational position, relative movement between the boot and the inner housing along the longitudinal axis is permitted so that the outer housing is configured to move axially with the boot a sufficient distance to allow the connector sub-assembly to rotate more than 90 degrees about the connector sub-assembly axis.

6. The optical connector of claim 4, further wherein:
in the second rotational position, the outer housing is configured to restrict the connector sub-assembly from rotating more than 90 degrees about the connector sub-assembly axis;
the boot is rotatable to relative to the inner housing about the longitudinal axis between the second rotational position and a third rotational position; and
in the third rotational position, relative movement between the boot and the inner housing along the longitudinal axis is permitted so that the outer housing is configured to move axially with the boot a sufficient distance to allow the connector sub-assembly to rotate more than 90 degrees about the connector sub-assembly axis.

7. The optical connector of claim 1, wherein:
the boot includes a locking arm having a catch;
in the first rotational position, the catch is configured to engage a surface of the inner housing to limit relative movement between the boot and the inner housing along the longitudinal axis to a first distance.

8. The optical connector of claim 7, wherein the first distance is substantially zero.

9. The optical connector of claim 7, wherein:
the rear portion of the inner housing defines a first slot and a second slot spaced from the first slot;
the first slot is configured to receive the catch of the locking arm when the boot is in the first rotational position, the first slot defining the surface that the catch is configured to engage to limit relative axial movement between the boot and the inner housing; and
the second slot is configured to receive the catch of the locking arm when the boot is in the second rotational position.

10. The optical connector of claim 9, wherein:
the first slot and the second slot extend parallel to the longitudinal axis; and
the second slot is configured to limit relative movement between the boot and the inner housing along the longitudinal axis to a second distance that is greater than the first distance.

11. The optical connector of claim 10, wherein:
the rear portion of the inner housing defines a rear flange and a ridge that extends axially along the rear portion;
the catch of the locking arm is a lateral extension that is received in space adjacent the ridge when the boot is in the first rotational position; and
the rear flange of the inner housing defines the surface that the catch is configured to engage to limit relative axial movement between the boot and the inner housing.

12. The optical connector of claim 7, wherein:
the boot comprises a substrate formed from a first material and a strain relief component formed from a second material that is less rigid than the first material;
the strain relief component is received over a portion of the substrate; and
the substrate defines the locking arm.

13. The optical connector of claim 12, wherein the substrate of the boot extends through an opening in a rear wall of the outer housing and defines a flange, and wherein the rear wall of the outer housing is positioned between the flange of the substrate and the strain relief component.

14. The optical connector of claim 1, wherein the connector sub-assembly comprises an LC connector according to IEC 61754-20:2012.

15. An optical connector, comprising:
a connector sub-assembly including:
a ferrule configured to support at least one optical fiber;
a connector body surrounding at least a portion of the ferrule; and
a latch arm extending outwardly and rearwardly from a front portion of the connector body, wherein an end portion of the latch arm can be depressed toward the connector body;
an inner housing having a front side in which a rear portion of the connector sub-assembly is received;
a boot extending from a rear side of the inner housing; and
an outer housing coupled to the boot and extending over at least the end portion of the latch arm of the connector sub-assembly, wherein a portion of the boot extends through an opening in a rear wall of the outer housing and defines a flange, wherein the rear wall of the outer housing is positioned between the flange of the substrate and the strain relief component, and wherein the outer housing and the boot are configured to rotate relative to each other about a longitudinal axis of the optical connector but move together along the longitudinal axis;
wherein:
the boot is rotatable relative to the inner housing about the longitudinal axis between a first rotational position and a second rotational position;
in the first rotational position, relative movement between the boot and the inner housing along the longitudinal axis is limited so that the outer housing is not configured to move axially rearward with the boot to depress the end portion of the latch arm; and
in the second position, relative movement between the boot and the inner housing along the longitudinal axis is permitted so that the outer housing is configured to move axially rearward with the boot to depress the end portion of the latch arm.

16. The optical connector of claim 15, wherein the connector sub-assembly is a first connector sub-assembly, and wherein the optical connector further comprises a second connector sub-assembly having a rear portion received in the front side of the inner housing, wherein the second connector sub-assembly has a construction similar to the first connector sub-assembly.

17. The optical connector of claim 15, wherein the boot has a one-piece construction.

18. The optical connector of claim 15, wherein:
the boot comprises a substrate formed from a first material and a strain relief component formed from a second material that is less rigid than the first material;
the strain relief component is received over a portion of the substrate; and
the substrate is the portion of the boot that extends through the opening in a rear wall of the outer housing and defines the flange.

\* \* \* \* \*